(12) United States Patent
Song et al.

(10) Patent No.: US 11,201,820 B2
(45) Date of Patent: Dec. 14, 2021

(54) SEGMENT ROUTING IN MPLS NETWORK

(71) Applicant: Huawei Technologies Co., Ltd., Shenzhen (CN)

(72) Inventors: Haoyu Song, San Jose, CA (US); Zhenbin Li, Beijing (CN); Tianran Zhou, Beijing (CN); James N. Guichard, Hollis, NH (US); Stewart Frederick Bryant, Merstham (GB); Andrew G. Malis, Andover, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/940,323

(22) Filed: Jul. 27, 2020

(65) Prior Publication Data

US 2020/0358698 A1 Nov. 12, 2020

Related U.S. Application Data

(63) Continuation of application No. PCT/CN2019/104438, filed on Sep. 4, 2019.

(60) Provisional application No. 62/727,440, filed on Sep. 5, 2018.

(51) Int. Cl.
*H04L 12/723* (2013.01)
*H04L 29/06* (2006.01)

(52) U.S. Cl.
CPC .............. *H04L 45/50* (2013.01); *H04L 69/22* (2013.01)

(58) Field of Classification Search
CPC ......... H04L 45/34; H04L 45/04; H04L 45/50; H04L 45/52; H04L 45/66; H04L 45/741; H04L 69/22
See application file for complete search history.

(56) References Cited

U.S. PATENT DOCUMENTS

| 8,144,710 | B2 | 3/2012 | McGuire et al. |
| 8,451,734 | B2 | 5/2013 | Cociglio et al. |
| 9,049,145 | B2 | 6/2015 | Li et al. |
| 2012/0069845 | A1 | 3/2012 | Carney et al. |
| 2014/0226662 | A1 | 8/2014 | Frost et al. |

(Continued)

OTHER PUBLICATIONS

"IPR Details—Cisco Systems, Inc.'s Statement about IPR related to draft-bryant-mpls-synonymous-flow-labels," Aug. 11, 2016, [https://datatracker.ietf.org/ipr/2849/], 4 pages.

(Continued)

*Primary Examiner* — Kan Yuen

(74) *Attorney, Agent, or Firm* — Vierra Magen Marcus LLP

(57) ABSTRACT

Described herein are methods and devices (e.g., routers) for performing segment routing over a multiprotocol label switching (MPLS) network. A method can include a router of the MPLS network receiving a packet, and the router modifying the packet by adding a segment routing header (SRH) type MPLS extension header. The SRH type MPLS extension header includes one or more segment identifiers (SIDs) that collectively provide a SID list for use in segment routing. The method further comprises the router copying one of the one or more SIDs in the SRH type MPLS extension header to a top of an MPLS label stack, and the router forwarding the packet as modified to another router of the MPLS network based on the one of the one or more SIDs included in a label stack entry at the top of the MPLS label stack.

21 Claims, 10 Drawing Sheets

(56) References Cited

U.S. PATENT DOCUMENTS

2016/0254994 A1    9/2016   Bryant et al.
2017/0302571 A1    10/2017  Frost et al.
2017/0310594 A1*   10/2017  Kotha ..................... H04L 49/25
2021/0021513 A1*   1/2021   Filsfils ................... H04L 12/46

OTHER PUBLICATIONS

"IPR Details—Cisco Systems, Inc.'s Statement about IPR related to draft-bryant-mpls-synonymous-flow-labels," Jun. 10, 2015, [https://datatracker.ietf/org/ipr/2605/], 4 pages.
"IPR Details—Telecom Italia SpA's Statement about IPR related to draft-bryant-mpls-sfl-framework," Nov. 1, 2015, [https://datatracker/ietf.org/ipr/2705], 4 pages.
"IPR Details—Telecom Italia SpA's Statement about IPR related to draft-bryant-mpls-sfl-flow-labels," Apr. 20, 2015, [https://datatracker/ietf.org/ipr/2582], 4 pages.

* cited by examiner

SEGMENT ROUTING IN MPLS NETWORK

PRIORITY CLAIM

This application is a continuation of PCT Patent Application No. PCT/CN2019/104438 filed Sep. 4, 2019 by Song et al., titled "SEGMENT ROUTING IN MPLS NETWORK," which claims priority to U.S. Provisional Patent Application No. 62/727,440 filed Sep. 5, 2018 by Song et al., titled "SEGMENT ROUTING IN MPLS NETWORK," both of which are incorporated by reference herein in their entirety. Priority is claimed to both of the above applications.

RELATED APPLICATION

This application is related to commonly invented and commonly assigned U.S. Provisional Patent Application No. 62/697,783, filed Jul. 13, 2018.

TECHNICAL FIELD

The disclosure generally relates to communication networks, and more particularly, to communications networks that utilize multi-protocol label switching (MPLS).

BACKGROUND

MPLS was originally conceived to improve the packet forwarding performance of Internet Protocol (IP) routers. However, it has subsequently been extended to carry other layer network technologies (like Asynchronous Transfer Mode (ATM), Frame Relay (FR), Plesiochronous Digital Hierarchy (PDH), etc.) by the use of Pseudowire (PW) encapsulation techniques. The architecture of the MPLS standard is set out in RFC 3031 entitled "Multiprotocol Label Switching Architecture" submitted by E. Rosen et al. in January 2001 to the Internet Engineering Task Force (IETF). Electronic copies of this document are available for download from the URL: www.ietf.org/rfc/rfc3031.txt. Updates to the MPLS standard are made available on the IETF's website https://datatracker.ietf.org/doc/.

MPLS essentially enables faster routing decisions by preconfiguring "tags" which determine a path between one router and the next. The "tags" are essentially labels carried in short packet header fields which are extracted by switching/forwarding network nodes (known as label switched routers (LSRs)). LSRs are preconfigured to associate certain labels with particular outgoing port(s) and hence traffic containing that label can be routed without a more detailed inspection of the packet header. This avoids the need for hop-by-hop routing decisions to be made on the IP layer network address, instead traffic is sent along a path predetermined by a particular set of labels.

MPLS label stacking is already known in the art as a means of implementing MPLS tunneling. To implement MPLS tunneling, an outer transport label is used to establish a bulk transport Label Switched Path (LSP) (which functions as a tunnel), often between the provider edge devices of a providers network, and within each bulk LSP, inner transport labels are used to identify each traffic flow. Each packet can carry many label stack entries organized as a last-in-first-out stack. In normal forwarding across an MPLS network, a LSR processes only the top (i.e., outermost) label. At any LSR, a labelled header can be added to the stack (by the LSR performing a "push" operation) or removed from the stack (by the LSR performing a "pop" operation). The label stacking allows the aggregation of LSPs into a single LSP for a portion of the route, which creates a "tunnel".

While MPLS has provided many benefits over prior networking protocols, as well as over some newer network protocols, it was not specifically designed to support in-network services. In-network services, as the term is used herein, refers to functions, applications, or services applied by network devices (e.g., routers) on user traffic.

Segment Routing (SR) is a flexible, scalable way of doing source routing, which is a type of packet routing where a source node (e.g., a source router) chooses a path that a packet will travel to its destination and encodes the path in a packet header as an ordered list of segments. Each segment can be identifier for any type of instruction, with each segment being identified by a segment identifier (SID). A segment instruction can be instructions to go to a specific node using the shortest path. Another exemplary segment instruction can be to go to a specific node using the shortest path to an intermediate node, and then follow links Layer 1, Layer 2, and Layer 3 to the destination node. A further exemplary segment instruction is to apply a specific service.

With segment routing, a network does not need to maintain a per-application and per-flow state. Rather, the network performs the forwarding instructions provided in a packet.

Segment Routing (SR) can be applied to an MPLS data plane or an Internet Protocol version 6 (IPv6) data plane. In other words, SR can work on top of either an MPLS network or on an IPv6 network. When SR is applied to an MPLS network, it is often referred to as MPLS Segment Routing, or SR-MPLS in short. When SR is applied to an IPv6 network, it is often referred to as SRv6. When a network uses segment routing, that network can be generally referred to as a Segment Routing (SR) network, regardless of whether the underlying network is an IPv6 network or an MPLS network. A router in an SR network is capable of selecting any path to forward traffic, whether the path is explicit or an Interior Gateway Protocol (IGP) shortest path. Segments represent path fragments (also known as sub-paths) that a router can combine to form a complete route to a network destination. Each segment has a segment identifier (SID) that is distributed throughout the network using new IGP extensions.

Conventionally, in SR-MPLS, segments are encoded as MPLS labels within the MPLS label stack (also known as the MPLS header) of a packet. In SRv6 network, a new header called a Segment Routing Header (SRH) is used, wherein segments in an SRH are encoded in a list of IPv6 addresses.

Compared to SRv6, SR-MPLS has several advantages. For example, MPLS has a much wider deployment base than IPv6. Further, SR-MPLS can be directly applied on an MPLS data plane without any change. Additionally, SID overhead in SR-MPLS is much smaller than SRv6's overhead. This is in part because each SID in SR-MPLS is only 4 octets, but each SID in SRv6 is 16 octets. Moreover, SRv6 also needs a base IPv6 header with a length of 40 octets. When a segment list is long, the overhead difference is even more significant.

On the other hand, SR-MPLS has its own drawbacks. When using conventional SR-MPLS, a SID label stack may be deep, which can hurt the forwarding performance when the bottom of the label stack needs to be accessed and/or deep packet inspection needs to be performed. For example, network load balancing based on an entropy label or an IP header, and other network services such as In-situ Operations, Administration, and Maintenance (IOAM), often rely on headers deeply embedded in a packet. A deep MPLS label stack is unfavorable in such occasions.

The compactness of an MPLS label stack entry (also referred to more succinctly as an MPLS label) is a double-edge sword. While it beneficially helps to reduce the header overhead, it unfortunately leaves no room to encode extra information other than the SID. Because of this, a noticeable missing feature of SR-MPLS is network programming, which is a powerful feature of SRv6.

SUMMARY

According to one aspect of the present disclosure, a method is provided for performing segment routing over a multiprotocol label switching (MPLS) network. The method comprises a router of the MPLS network receiving a packet, and the router modifying the packet by adding a segment routing header (SRH) type MPLS extension header. The SRH type MPLS extension header includes one or more segment identifiers (SIDs) that collectively provide a SID list for use in segment routing. The method further comprises the router copying one of the one or more SIDs in the SRH type MPLS extension header to a top of an MPLS label stack, and the router forwarding the packet as modified to another router of the MPLS network based on the one of the one or more SIDs included in a label stack entry at the top of the MPLS label stack.

Optionally, in any of the preceding aspects, the SRH type MPLS extension header added to the packet by the router also includes a next header type (NHT) field, a header length (HLEN) field, a segment counter (SC) field, and a segment pointer (SP) field. Content of the NHT field specifies a type of a next header included in the packet as modified. Content of the HLEN field specifies a length of the SRH type MPLS extension header. Content of the SC field specifies a total number of SIDs in the SRH type MPLS extension header. Content of the SP field specifies which SID within the SRH type extension header is included in the label stack entry at the top of the MPLS label stack.

Optionally, in any of the preceding aspects, the SRH type MPLS extension header added to the packet by the router also includes a separate corresponding function and argument field for each SID of the one or more SIDs included in the SRH type MPLS extension header. For each SID, of the one or more SIDs included in the SRH type MPLS extension header, content of the corresponding function and argument field includes instructions and parameters for use in network programming associated with a segment specified by the SID.

Optionally, in any of the preceding aspects, the router modifying the packet also comprises the router adding an indication within the MPLS label stack that one or more MPLS extension headers have been added to the packet.

Optionally, in any of the preceding aspects, the MPLS label stack includes a plurality of MPLS label stack entries, and the indication within the MPLS label stack that one or more MPLS extension headers have been added to the packet comprises an extension header label (EHL) within a label value field within one of the plurality of MPLS label stack entries included in the MPLS label stack.

Optionally, in any of the preceding aspects, the EHL comprises one of sixteen special-purpose label values that are reserved by the MPLS working group of the Internet Engineering Task Force (IETF). Alternatively, another one of the plurality of MPLS label stack entries included within the MPLS label stack includes a special-purpose label value of 15, which is reserved by the MPLS working group of the IETF to indicate that an Extension Label is included in the MPLS label stack and enables the router to identify the EHL. In still other embodiments, a forward equivalent class (FEC) indicates that one or more MPLS extension headers follow the MPLS label stack.

Optionally, in any of the preceding aspects, the router of the MPLS network, that receives and modifies the packet by adding the SRH type MPLS extension header, comprises a segment router source node.

According to one other aspect of the present disclosure, a router for inclusion in an MPLS network comprises a network interface, memory storage, and one or more processors. The network interface is configured to receive and forward packets over the MPLS network. The memory storage comprises instructions. The one or more processors is/are in communication with the memory and with the network interface. The one or more processors execute the instructions to modify a packet received via the network interface by adding an SRH type MPLS extension header, the SRH type MPLS extension header including one or more SIDs that collectively provide a SID list for use in segment routing. The one or more processors also execute instructions to copy one of the one or more SIDs in the SRH type MPLS extension header to a top of an MPLS label stack, and forward the packet as modified via the network interface to another router of the MPLS network based on the one of the one or more SIDs included in a label stack entry at the top of the MPLS label stack.

Optionally, in any of the preceding aspects, the SRH type MPLS extension header added to the packet by the router also includes an NHT field, an HLEN field, an SC field, and an SP field. Content of the NHT field specifies a type of a next header included in the packet as modified. Content of the HLEN field specifies a length of the SRH type MPLS extension header. Content of the SC field specifies a total number of SIDs in the SRH type MPLS extension header. Content of the SP field specifies which SID within the SRH type extension header is included in the label stack entry at the top of the MPLS label stack.

Optionally, in any of the preceding aspects, the SRH type MPLS extension header added to the packet by the router also includes a separate corresponding function and argument field for each SID of the one or more SIDs included in the SRH type MPLS extension header. For each SID, of the one or more SIDs included in the SRH type MPLS extension header, content of the corresponding function and argument field includes instructions and parameters for use in network programming associated with a segment specified by the SID.

Optionally, in any of the preceding aspects, the one or more processors, when executing the instructions to modify the packet, add an indication within the MPLS label stack that one or more MPLS extension headers have been added to the packet.

Optionally, in any of the preceding aspects, the router that receives and modifies the packet comprises a segment router source node.

According to one aspect of the present disclosure, a method is provided for performing segment routing over an MPLS network. The method comprises a router of the MPLS network receiving a packet including an MPLS label stack and an SRH type MPLS extension header. The MPLS label stack includes a plurality of label stack entries with a label stack entry at a top of the MPLS label stack including a SID used to forward the packet to the router, and the SRH type MPLS extension header includes one or more SIDs that collectively provide a SID list for use in segment routing.

The router, after receiving the packet, copying one of the one or more SIDs in the SRH type MPLS extension header to the top of the MPLS label stack. The router, after copying one of the one or more SIDs in the SRH type MPLS extension header to the top of the MPLS label stack, forwarding the packet to another router of the MPLS network based on the one of the one or more SIDs included in the label stack entry at the top of the MPLS label stack.

Optionally, in any of the preceding aspects, the method further comprises the router, after receiving the packet, but before performing the copying, determining whether there is at least one additional segment over which segment routing is to be performed for the packet. The router, in response to determining there is at least one additional segment over which segment routing is to be performed for the packet, performing the copying.

Optionally, in any of the preceding aspects, the SRH type MPLS extension header includes a function and argument field for each SID of the one or more SIDs included in the SRH type MPLS extension header. The router, after receiving the packet, but before performing the copying, comparing the SID in the label stack entry at the top of the MPLS label stack to a SID of the router to determine whether they match. The router, in response to determining that the SID in the label stack entry at the top of the MPLS label stack matches the SID of the router, performing one or more functions specified by contents of the function and argument field included in the SRH type MPLS extension header for the SID in the label stack entry at the top of the MPLS label stack.

Optionally, in any of the preceding aspects, the SRH type MPLS extension header included in the packet received by the router also includes an NHT field, a HLEN field, an SC field, and an SP field. Contents of such fields were summarized above.

Optionally, in any of the preceding aspects, the content of the SP field comprises an SP value, and the method further comprises the router, after receiving the packet, but before performing the copying, incrementing the SP value. The router, after incrementing the SP value, selecting based on the SP value which one of the one or more SIDs included in the SRH type MPLS extension header is copied to the top of the MPLS label stack.

Optionally, in any of the preceding aspects, the method further comprises the router receiving a further packet including a SID within a label stack entry at a top of an MPLS label stack of the further packet, and also including an SRH type MPLS extension header including one or more SIDs that collectively provide a SID list for use in segment routing of the further packet. The router, after receiving the further packet, determining whether there is at least one additional segment over which segment routing is to be performed for the further packet. The router, in response to determining there is no additional segment over which segment routing is to be performed for the further packet, removing the SRH type MPLS extension header from the further packet, and also removing the label stack entry including the SID at the top of the MPLS label stack of the further packet.

Optionally, in any of the preceding aspects, the determining, whether there is at least one additional segment over which segment routing is to be for the further packet, is based on an SC value included in the SC field and an SP value included in the SP field of the SRH type MPLS header of the further packet.

According to one other aspect of the present disclosure, a router for inclusion in an MPLS network comprises a network interface, a memory storage, and one or more processors in communication with the memory and with the network interface. The network interface is configured to receive and forward packets over the MPLS network. The memory storage comprises instructions. The one or more processors execute the instructions to receive a packet including an MPLS label stack and an SRH type MPLS extension header. The MPLS label stack includes a plurality of label stack entries with a label stack entry at a top of the MPLS label stack including a SID used to forward the packet to the router. The SRH type MPLS extension header includes one or more SIDs that collectively provide a SID list for use in segment routing. The one or more processors also execute the instructions to copy one of the one or more SIDs in the SRH type MPLS extension header to the top of the MPLS label stack, and forward the packet to another router of the MPLS network based on the one of the one or more SIDs included in the label stack entry at the top of the MPLS label stack.

Optionally, in any of the preceding aspects, the SRH type MPLS extension header includes a function and argument field for each SID of the one or more SIDs included in the SRH type MPLS extension header. The one or more processors execute the instructions to compare the SID in the label stack entry at the top of the MPLS label stack to a SID of the router to determine whether they match, and in response to determining that the SID in the label stack entry at the top of the MPLS label stack matches the SID of the router, perform one or more functions specified by contents of the function and argument field included in the SRH type MPLS extension header for the SID in the label stack entry at the top of the MPLS label stack.

Optionally, in any of the preceding aspects, the SRH type MPLS extension header included in the packet received by the router also includes an NHT field, an HLEN field, an SC field, and an SP. Contents of such fields were summarized above.

Optionally, in any of the preceding aspects, content of the SP field comprises an SP value, and the one or more processors execute the instructions to increment the SP value, after the packet is received, but before the copying is performed, and select based on the incremented SP value which one of the one or more SIDs included in the SRH type MPLS extension header is copied to the top of the MPLS label stack.

Optionally, in any of the preceding aspects, the one or more processors execute the instructions to receive a further packet including a SID within a label stack entry at a top of an MPLS label stack of the further packet, and also including an SRH type MPLS extension header including one or more SIDs that collectively provide a SID list for use in segment routing of the further packet. The one or more processors also execute the instructions to determine whether there is at least one additional segment over which segment routing is to be performed for the further packet, and in response to determining there is no additional segment over which segment routing is to be performed for the further packet, remove the SRH type MPLS extension header from the further packet, and also remove the label stack entry including the SID at the top of the MPLS label stack of the further packet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The present disclosure will now be described with reference to the figures, which in general relate to methods and devices (e.g., routers) that add one or more in-network services to an MPLS network and/or perform segment routing over an MPLS network. It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
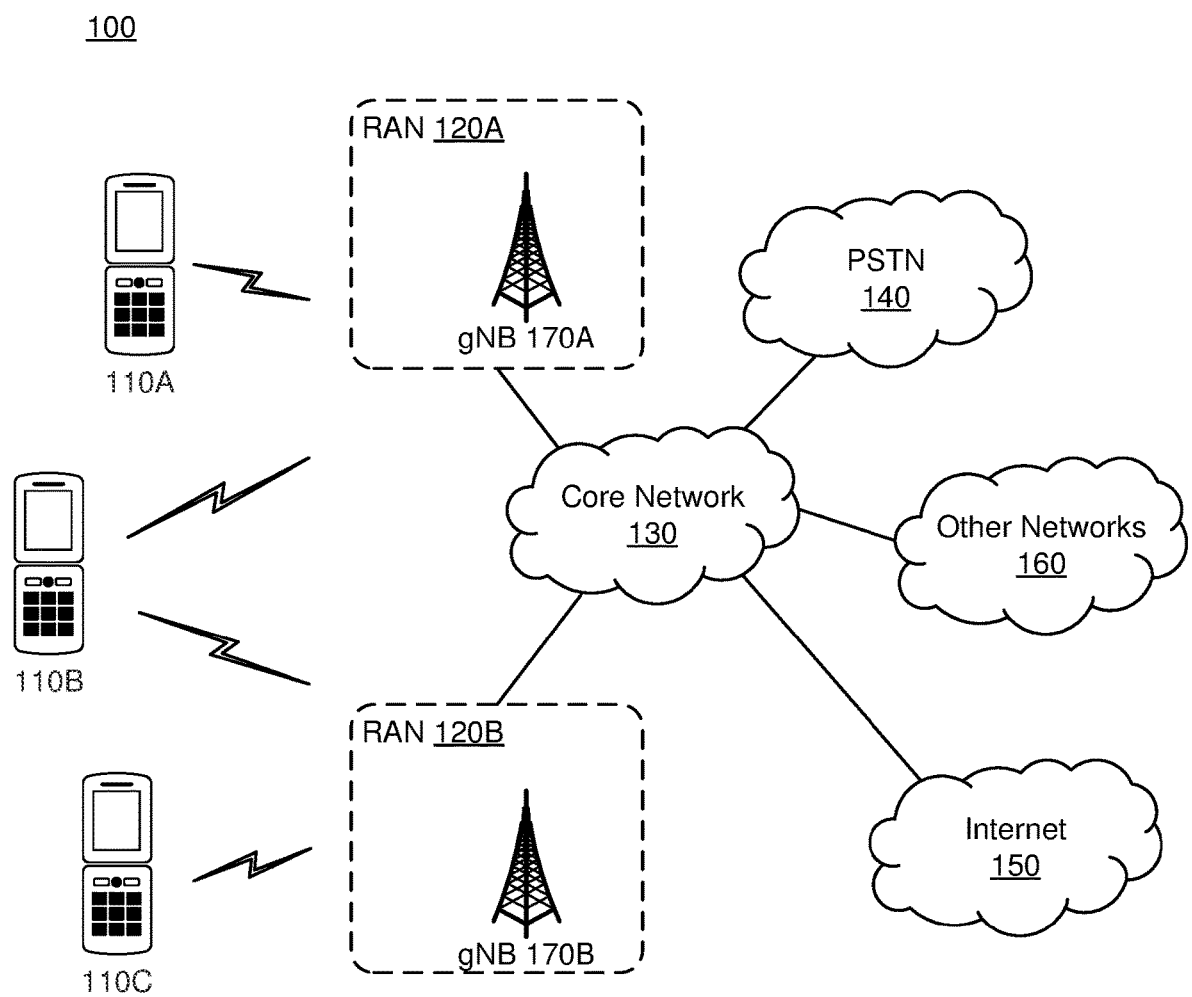
FIG. 1 illustrates an exemplary communication system for communicating data.

FIG. 1 illustrates an exemplary communication system 100 with which embodiments of the present technology can be used. The communication system 100 includes, for example, user equipment 110A, 110B, and 110C, radio access networks (RANs) 120A and 120B, a core network 130, a public switched telephone network (PSTN) 140, the Internet 150, and other networks 160. Additional or alternative networks include private and public data-packet networks, including corporate intranets. While certain numbers of these components or elements are shown in the figure, any number of these components or elements may be included in the system 100.

In one embodiment, the communication system 100 can include a wireless network, which may be a fifth generation (5G) network including at least one 5G base station which employs orthogonal frequency-division multiplexing (OFDM) and/or non-OFDM and a transmission time interval (TTI) shorter than 1 milliseconds (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A, 110B, and 110C, which can be referred to individually as an UE 110, or collectively as the UEs 110, are configured to operate and/or communicate in the system 100. For example, an UE 110 can be configured to transmit and/or receive wireless signals or wired signals. Each UE 110 represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A, 120B include one or more base stations (BSs) 170A, 170B, respectively. The RANs 120A and 120B can be referred to individually as a RAN 120, or collectively as the RANs 120. Similarly, the base stations (BSs) 170A and 170B can be referred to individually as a base station (BS) 170, or collectively as the base stations (BSs) 170. Each of the BSs 170 is configured to wirelessly interface with one or more of the UEs 110 to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the BS 170A forms part of the RAN 120A, which may include one or more other BSs 170, elements, and/or devices. Similarly, the BS 170B forms part of the RAN 120B, which may include one or more other BSs 170, elements, and/or devices. Each of the BSs 170 operates to transmit and/or receive wireless signals within a particular geographic region or area, sometimes referred to as a "cell." In some embodiments, multiple-input multiple-output (MIMO) technology may be employed having multiple transceivers for each cell.

The BSs 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the BSs 170 and UEs 110 are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120 are in communication with the core network 130 to provide the UEs 110 with voice, data, application, Voice over Internet Protocol (VoIP), or other services. As appreciated, the RANs 120 and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

The RANs 120 may also include millimeter and/or microwave access points (APs). The APs may be part of the BSs 170 or may be located remote from the BSs 170. The APs may include, but are not limited to, a connection point (an mmW CP) or a BS 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipments, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDAs, iPads, Tablets, mobile terminals, smart phones, laptop embedded equipped (LEE), laptop mounted equipment (LME) and USB dongles.

One or more of the networks 130, 140, 150 and/or 160 (or portions thereof) can utilize Multiprotocol Label Switching (MPLS), which is a type of data-carrying technique for high-performance telecommunications networks. In other words, one or more of the networks 130, 140, 150 and/or 160 can be or can include an MPLS network.

MPLS directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol". MPLS supports a range of access technologies, including T1/E1, asynchronous transfer mode (ATM), Frame Relay (FR), and data subscriber line (DSL), just to name a few.

As noted above, MPLS was originally conceived to improve the packet forwarding performance of Internet Protocol (IP) routers. However, it has subsequently been extended to carry other layer network technologies (like Asynchronous Transfer Mode (ATM), Frame Relay (FR), Plesiochronous Digital Hierarchy (PDH), etc.) by the use of Pseudowire (PW) encapsulation techniques.

MPLS essentially enables faster routing decisions by preconfiguring "tags" which determine a path between one router and the next. The "tags" are essentially labels carried in short packet header fields which are extracted by switching/forwarding network nodes, known as label switched routers (LSRs). LSRs are preconfigured to associate certain labels with particular outgoing port(s) and hence traffic containing that label can be routed without a more detailed inspection of the packet header. This avoids the need for hop-by-hop routing decisions to be made on the IP layer network address, instead traffic is sent along a path predetermined by a particular set of labels.

MPLS label stacking is already known in the art as a means of implementing MPLS tunneling. To implement MPLS tunneling, an outer transport label is used to establish a bulk transport Label Switched Path (LSP) (which functions as a tunnel), often between the provider edge devices of a providers network, and within each bulk LSP inner transport labels are used to identify each traffic flow. Each packet can carry many label stack entries organized as a last-in-first-out stack. In normal forwarding across an MPLS network an LSR processes only the top (i.e., outermost) label. At any LSR, a labelled header can be added to the stack (by the LSR performing a "push" operation) or removed from the stack (by the LSR performing a "pop" operation). The label stacking allows the aggregation of LSPs into a single LSP for a portion of the route, which creates a "tunnel".

Figure 2:
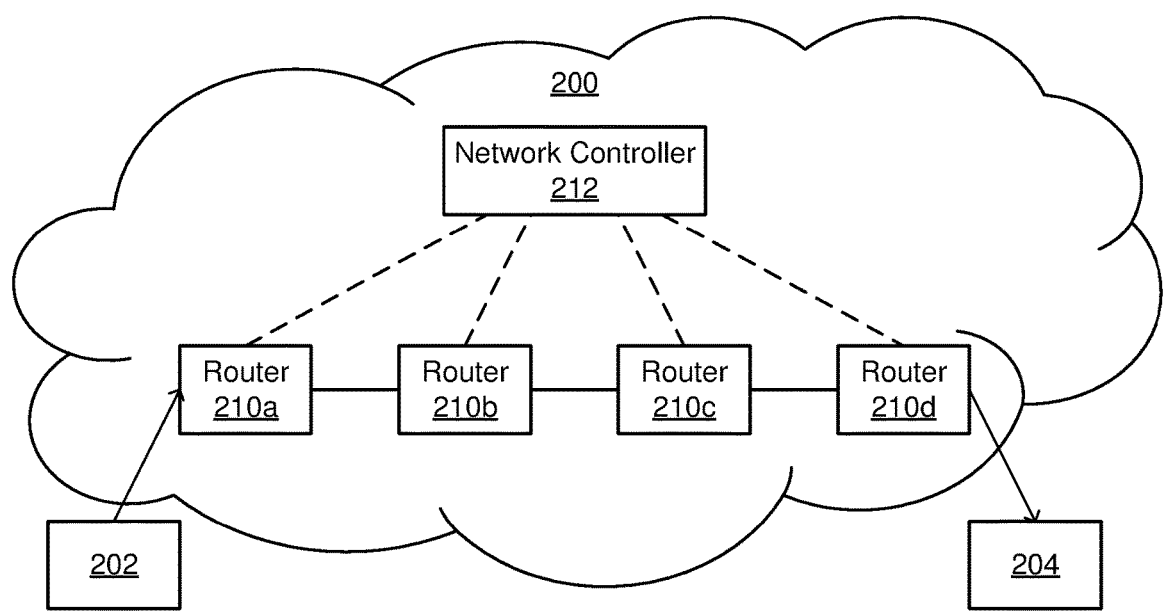
FIG. 2 illustrates an exemplary MPLS network, which may be or be included in one of the networks shown in FIG. 1.

FIG. 2 illustrates an exemplary MPLS network 200 that includes routers 210a, 210b, 210c, and 210d, each of which can be referred to as a router 210, or which can be collectively referred to as the routers 210. While only four routers 210 are shown in FIG. 2, an MPLS network would likely include significantly more than four routers 210. Each of the routers 210 can also be referred to more generally as a node of the MPLS network 200. FIG. 2 also shows how the MPLS network 200 can be used to transport one or more packets from a first device 202 to a second device 204, both of which are communicatively coupled to the MPLS network 200. FIG. 2 also illustrates a network controller 212 that is communicatively coupled to each of the routers 210 of the MPLS network 200, as represented in dashed lines. The network controller 212 can be used to perform a variety of control path and/or control plane functions. The control plane of an MPLS network (e.g., 200) is the part of the router architecture that is responsible for collecting and propagating the information that will be used later to forward incoming packets. Routing Protocols and label distribution protocols are parts of the control plane. The control plane is responsible for exchanging layer 3 routing information and labels. By contrast, a data plane of an MPLS network is responsible for forwarding packet based on labels and IP header. The data plane can have a simple forwarding engine that maintains a Label Forwarding Information Base (LFIB), which is a table a router uses to forward labelled packets through a network, and a Forwarding Information Base (FIB), which is a table that a router looks at when deciding where to forward traffic.

As noted above, the router 210 can also be referred to as a node of the MPLS network 200. When the MPLS network 200 is used to transfer one or more packets from the first device 202 to the second device 204, the router 210a can be more specifically referred to as an ingress router or ingress node, and the router 210d can be more specifically referred to as an egress router or egress node. Even more specifically, the ingress router 210a can be referred to as a Label Edge Router (LER), which is a router that first encapsulates a packet inside an MPLS Label Switched Path (LSP), wherein the MPLS LSP is essentially a unidirectional tunnel between a pair of routers of an MPLS network. The router 210d can be referred to more specifically as the egress router. The routers 210b and 210c can be referred to more specifically as label switch routers (LSRs) or transit nodes, which are routers that perform MPLS switching in the middle of an LSP. The router 210d, which as noted above can be referred to more as the egress node, is the final router at the end of the LSP.

When an unlabeled packet enters the ingress router (e.g., 210a in FIG. 2) and needs to be passed on to an MPLS tunnel, the router first determines the forwarding equivalence class (FEC) for the packet and then inserts one or more labels in the packet's newly created MPLS header, which can also be referred to as an MPLS label stack. The packet is then passed on to the next hop router for this tunnel. An MPLS header includes a stack of one or more MPLS label stack entries, and thus, an MPLS header can also be referred to as an MPLS label stack. The format of an MPLS label stack entry is discussed below with reference to FIG. 4A.

An MPLS header can be added between the network layer header (i.e., the layer 3 header) and the link layer header (i.e., the layer 2 header) of the Open Systems Interconnection model (OSI model). Because MPLS often operates at the layer that is generally considered to lie between the traditional definitions of OSI Layer 2 (data link layer) and Layer 3 (network layer), MPLS is often referred to as a layer 2.5 protocol. MPLS was designed to provide a unified data-carrying service for both circuit-based clients and packet-switching clients which provide a datagram service model. MPLS can be used to carry many different kinds of traffic, including IP packets, as well as native ATM, SONET, and Ethernet frames. Is it also possible that an MPLS header can be added between other layers of the OSI model, besides between layers 3 and 2.

When a labeled packet is received by an MPLS router (e.g., 210b or 210c in FIG. 2), the topmost label is examined. Based on the contents of the label a swap, push (impose), or pop (dispose) operation is performed on the packet's MPLS label stack. As will be described in additional detail below with reference to FIG. 4B, an MPLS label stack includes a plurality of MPLS label stack entries. Routers (e.g., 210 in FIG. 2) can have prebuilt lookup tables that tell them which kind of operation to perform, based on the topmost label of the incoming packet so they can process the packet very quickly. In a swap operation the label is swapped with a new label, and the packet is forwarded along the path associated with the new label. In a push operation a new label is pushed on top of the existing label, effectively "encapsulating" the packet in another layer of MPLS. This allows hierarchical routing of MPLS packets. Notably, this is used by MPLS virtual private networks (VPNs). In a pop operation, the label is removed from the packet, which may reveal an inner label below. This process is called "decapsulation". If the popped label was the last on the label stack, the packet "leaves" the MPLS tunnel. This can be done by the egress router (e.g., 210d in FIG. 2).

During the above described operations, the contents of the packet below the MPLS Label stack are not examined. Indeed, transit routers (also referred to as LSRs) typically need only to examine the topmost label on the stack. The forwarding of the packet is done based on the contents of the labels, which allows "protocol-independent packet forwarding" that does not need to look at a protocol-dependent routing table and avoids the expensive IP longest prefix match at each hop.

At the egress router (e.g., 210d in FIG. 2), when the last label has been popped, only the payload remains. This can be an IP packet, or any of a number of other kinds of payload packet. The egress router must therefore have routing information for the packet's payload, since it must forward it without the help of label lookup tables. An MPLS transit router (e.g., 210b and 210c in FIG. 2) has no such requirement.

Usually (by default with only one label in the stack, accordingly to the MPLS specification), the last label is popped off at the penultimate hop (the hop before the egress router). This is called penultimate hop popping (PHP). By using PHP, transit routers connected directly to this egress router effectively offload it, by popping the last label themselves. In the label distribution protocols, this PHP label pop action is advertised as reserved or special-purpose label value 3 "implicit-null" (which is never found in a label, since it means that the label is to be popped).

Figure 3:
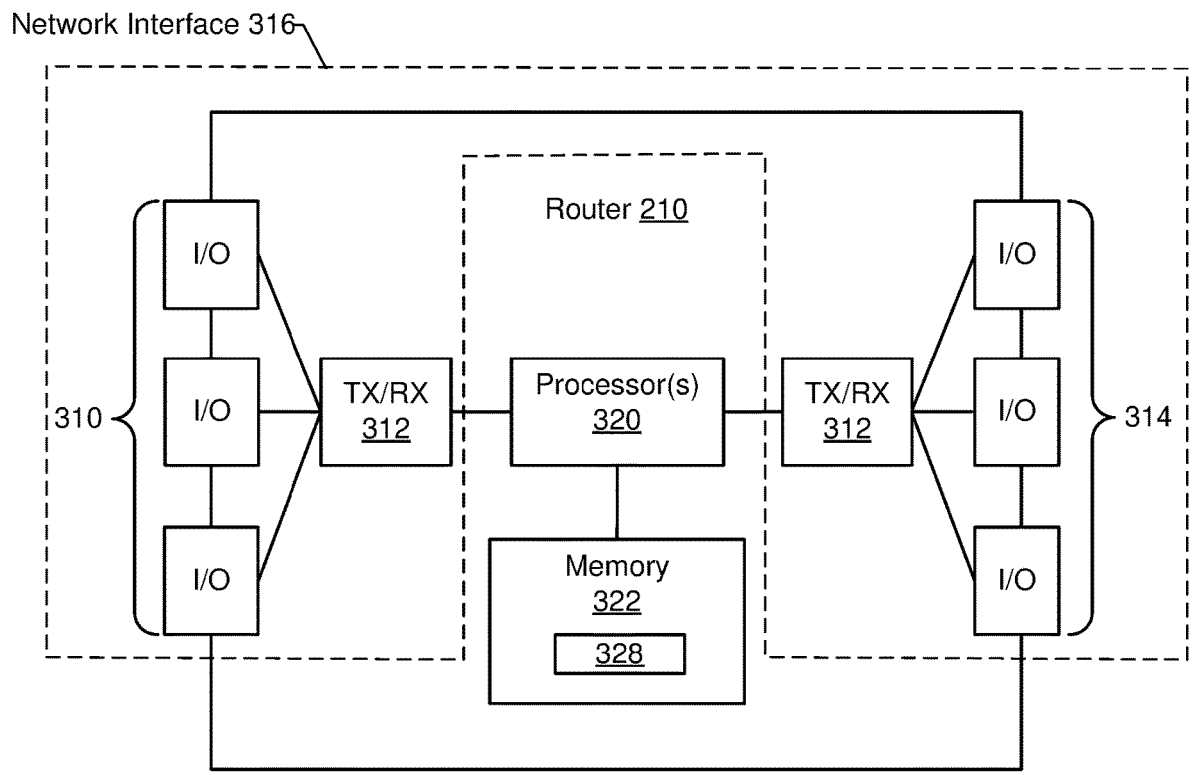
FIG. 3 is a schematic diagram illustrating exemplary details of a router of an MPLS network, such as the MPLS network shown in FIG. 2.

FIG. 3 is a schematic diagram illustrating exemplary details of a router 210, or more generally a network node, according to an embodiment. The router or network node 210 can be configured to implement or support embodiments of the present technology disclosed herein. The router 210 may comprise downstream ports 310, transceivers (TX/RX) 312, memory 322, one or more processor(s) 320, and upstream ports 314. The ports 310 and 314 and the transceivers 312 can be collectively referred to as a network interface 316 that is configured to receive and transmit packets over an MPLS network.

The memory 322 may include a data packet modifying and forwarding block 328 that may be implemented on the processor(s) 320. The data packet modifying and forwarding block 328 may be used to implement embodiments of the present technology described herein, including, but not limited to, the methods summarized with reference to FIG. 6. Alternatively, the data packet modifying and forwarding block 328 may be implemented directly on at least one of the processor(s) 320. The data modifying and packet forwarding block 328 may be used to modify data packets and route data packets using routing information within the data packets. More specifically, the processor(s) 320 can be configured to implement embodiments of the present technology described below. In accordance with certain embodiments, the memory 322 stores computer readable instructions that are executed by the processor(s) 320 to implement embodiments of the present technology. It would also be possible for embodiments of the present technology described below to be implemented, at least partially, using hardware logic components, such as, but not limited to, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc.

Figure 4A:
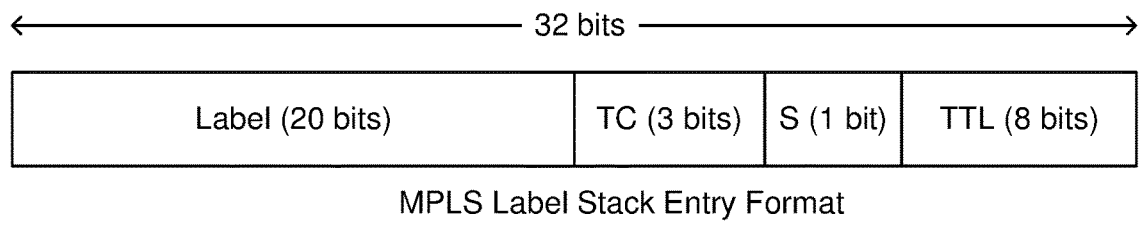
FIG. 4A shows the format of an MPLS label stack entry.

FIG. 4A shows the format of an MPLS label stack entry, which can also be referred to more succinctly as a label stack entry. The MPLS label stack entry is 32 bits in length (i.e., four octets) and comprises several functional fields. An MPLS label stack, which can also be referred to as an MPLS header, comprises a sequence of MPLS label stack entries. An exemplary position of the MPLS label stack in a frame (or equivalently in a packet) is shown in FIG. 4B.

As shown in FIG. 4A, a conventional 32 bit MPLS label stack entry comprises a 20 bit Label field, a 3 bit Traffic Class (TC) field, a 1 bit Bottom of Stack (S) field, and an 8 bit Time-To-Live (TTL) field. The 20 bit Label field of each label stack entry includes a label value. The MPLS Label field has an address space of 2^20 labels, i.e., 1,048,576 labels. However, as will be discussed in additional detail below, label values 0-15 are reserved by the IETF and cannot be used for dynamic label binding. The TTL field, which indicates the time to live of the MPLS packet, is used to prevent infinite forwarding loops of MPLS packets. The S field is the bottom of stack (BoS) field, which is also known as the bottom of stack flag, indicates where the MPLS label stack entry is in an MPLS header. When S=1 (i.e., when the bottom of stack flag is set), this indicates the MPLS label stack entry is at the bottom (i.e., innermost position which is closest to the payload) position in an MPLS header. When S=0 (i.e., when the bottom of stack flag is not set), this indicates the MPLS label stack entry is not at the bottom position in an MPLS header, and thus, there is at least one further label stack entry below. In other words, when S=1 in an MPLS label stack entry, this indicates that the MPLS label stack entry is at the bottom of the MPLS label stack. The 3 bit TC field can be used, e.g., to specify Quality of Service (QoS) priority and/or provide an Explicit Congestion Notification (ECN). Prior to 2009 the TC field was called the experiment (EXP) field.

Figure 4B:
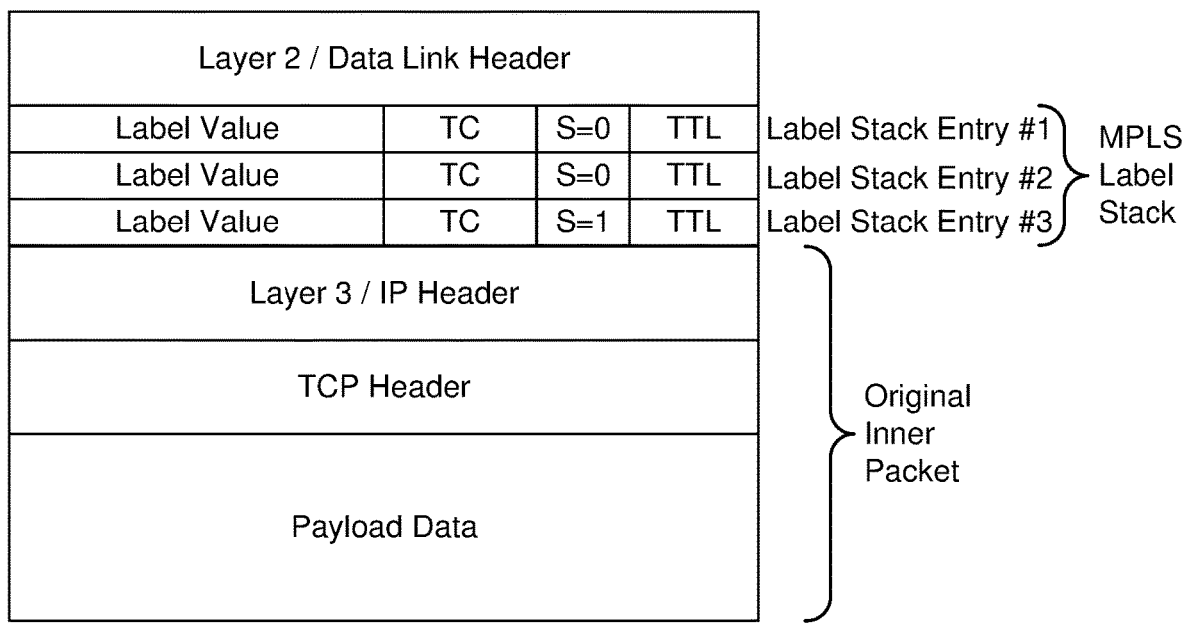
FIG. 4B shows the how the MPLS label stack entries can be positioned between a layer 2 (i.e., the data link layer) header and a layer 3 (i.e., the network layer) header.

FIG. 4B shows the how MPLS label stack entries can be positioned between a layer 2 (i.e., the data link layer) header and a layer 3 (i.e., the network layer) header. The layer 2 header can be, e.g., an Ethernet header that includes, destination and source Media Access Control (MAC) addresses (each six octets in length), an EtherType field (which is two octets long), and, optionally, an IEEE 802.1Q tag or IEEE 802.1ad tag. The layer 3 header can be, e.g., an Internet Protocol version 4 (IPv4) header, which is 256 bits long, or an Internet Protocol version 6 (Ipv6) header, which is 288 bits long, but is not limited thereto. Additionally, or alternatively, other headers may be added, for example, there could also be a Pseudowire (PW) Control Word header if the payload data is not Internet Protocol (IP). FIG. 4B provides just one example of how MPLS label stack entries can be positioned within a datagram. For example, it would also be possible for a layer 2 packet header (instead of a layer 3 packet header) to be below the MPLS label stack.

In the example shown in FIG. 4B, the MPLS label stack (i.e., the MPLS header) is shown as including three MPLS label stack entries, label stack entry #1, label stack entry #2, and label stack entry #3, each of which can also be referred to as a stack entry, with the label stack entry #3 being the bottom of the stack entry. Notice that in each of the label stack entry #1 and the label stack entry #2, S=0, meaning these label stack entries are not the bottom of the stack. Also notice that in the label stack entry #3, S=1, meaning this label stack entry is the bottom of the stack entry.

The MPLS working group of the Internet Engineering Task Force (IETF) is responsible for standardizing MPLS related technologies. The theoretical number of MPLS label values which could be provided by the 20 bit label value field of the MPLS header is 2^20, as noted above. However, in practice, the MPLS working group has reserved some label values for use as special-purpose labels. More specifically, 16 label values of the 2^20 possible label values have been reserved for special-purpose labels. So far, only 8 of the 16 reserved special-purpose label values have been allocated (which can also be referred to as assigned) by the MPLS working group, meaning an additional 8 reserved special-purpose label values are still unallocated (which can also be referred to as unassigned or still available). More specifically, the special-purpose label values 0-3, 7, and 13-15 have already been allocated, and the special-purpose label values 4-6, and 8-12 are still unallocated. Table 1, shown below, lists the special-purpose MPLS label values that have already been assigned, as well as those that are still unassigned.

TABLE 1

| Value | Description |
|---|---|
| 0 | Ipv4 Explicit NULL Label |
| 1 | Router Alert Label |
| 2 | Ipv6 Explicit NULL Label |
| 3 | Implicit NULL Label |
| 4-6 | Unassigned |
| 7 | Entropy Label Indicator (ELI) |
| 8-12 | Unassigned |
| 13 | GAL Label |
| 14 | OAM Alert Label |
| 15 | Extension Label |

Referring again to FIG. 2, as well as to FIG. 4B, when a labelled packet is received by an LSR (e.g., 210b or 210c in FIG. 2), the label value at the top of the MPLS label stack (i.e., closest to the layer 2 header in FIG. 4B) is first processed to look up forwarding information. This allows the receiving LSR to learn the port to which the packet can be forwarded and/or any operation(s) to be performed on the MPLS stack before forwarding. Examples of operations an LSR performs on an MPLS stack include replacing the top label stack entry with another value, popping an entry off the label stack, replacing the top label stack entry, or pushing one or more additional entries onto the MPLS label stack, as was discussed above. Other operations an LSR can perform include learning the outgoing data link encapsulation and any other information needed to properly forward the packet.

Depending on the label value assigned to the MPLS label field and other fields in an MPLS label stack entry, the label field can be interpreted in several ways by a receiving LSR. The label field can function, for example, as a forwarding label, as a source label, or as a functional label to indicate an operation that the LSR must perform.

When used as a forwarding label the label value field of the MPLS label stack entry functions as a proxy identifier for the "address" of the LSP destination end-point. In the case where this MPLS label stack entry is at the top of a stack of LSP MPLS headers, S=0. If it is, however, the sole MPLS label stack entry in the stack, then S=1. When used as a forwarding label, the label value field of the MPLS label stack entry is used to forward the MPLS traffic unit in the data plane towards the destination on a hop-by-hop basis, except when penultimate-hop-popping (PHP) is used, in which case the forwarding header is removed completely on the last hop.

While MPLS has provided many benefits over prior networking protocols, as well as over some newer network protocols, it would be beneficial if MPLS could support multiple in-network services. In other words, a technical problem with MPLS is that it was not designed to support in-network services, such as, but not limited to, Network Service Header (NSH), In-situ Operations, Administration, and Maintenance (IOAM), Segment Routing (SR), and network programming. In-network services, as the term is used herein, refers to functions, applications, or services applied by network devices (e.g., routers) on user traffic. Such in-networks services are usually performed by adding some header to the user packets, with the header encoding the necessary information for the service. The header is usually removed before the user packet is delivered to the destination so that it is agnostic to end users. Embodiments of the present technology, as will be described in additional detail below, can be used to add one or more in-network services to an MPLS network that does not otherwise support such in-network service(s). However, before describing such embodiments, it is first useful to briefly describe some of the in-network services that can be added to an MPLS network using embodiments of the present technology.

Network Service Header (NSH) contains service path information and optionally metadata that are added to a packet or frame and used to create a service plane, i.e., to realize service function paths. An outer transport header is imposed, on NSH and the original packet/frame, for network forwarding. A Service Classifier adds NSH. NSH is removed by the last Service Function Forwarder (SFF) in the service chain or by a Service Function (SF) that consumes the packet. Service functions are widely deployed and essential in many networks. These service functions provide a range of features such as security (e.g., by adding firewalls), Wide Area Network (WAN) acceleration, and server load balancing. Service functions may be instantiated at different points in the network infrastructure such as the wide area network, data center, campus, and so forth. NSH defines a service plane protocol specifically for the creation of dynamic service chains and is composed of the following elements: Service Function Path identification; indication of location within a Service Function Path; and optional per packet metadata (fixed length or variable). NSH is composed of a 4-byte Base Header, a 4-byte Service Path Header and optional Context Headers. The NSH standard and updates thereto are made available on the IETF's website https://datatracker.ietf.org/doc/. Prior to the embodiments described herein, there was not believed to be any way of adding NSH services to an MPLS network.

In-situ Operations, Administration, and Maintenance (IOAM) records operational information and telemetry information in a packet while the packet traverses a path between two points in a network. The term "in-situ" refers to the fact that the OAM data is added to the data packets rather than being sent within packets specifically dedicated to OAM. "In-situ" mechanisms do not require extra packets to be sent and hence don't change the packet traffic mix within the network. IOAM mechanisms can be leveraged where network mechanisms being used to transport packets do not apply or do not offer the desired results, such as proving that a certain traffic flow takes a pre-defined path, Service Level Agreement (SLA) verification for the live data traffic, detailed statistics on traffic distribution paths in networks that distribute traffic across multiple paths, or scenarios in which probe traffic is potentially handled differently from regular data traffic by the network devices. The IOAM standard and updates thereto are made available on the IETF's website https://datatracker.ietf.org/doc/i. Prior to the embodiments described herein, there was not believed to be any way to add multiple in-network services to an MPLS network, such as adding both NSH and IOAM services. Network programming can be supported by encoding some instructions into an MPLS extension header, which instructions tell a router to execute some specific functions.

The current MPLS standard does not support multiple in-network services, but rather, can at best support only a single network service. Further, in order to support a single network service, the current MPLS standard requires full label stack scanning, which can adversely affect network performance. Additionally, the current MPLS standard already has some overloaded label semantics, meaning certain labels, such as the Generic Associated Channel Label (GAL), are already being used for multiple purposes.

Embodiments of the present technology, described herein, can be used to overcome the above noted technical problem with MPLS, namely that it was not designed to support in-network services. More specifically, embodiments of the present technology described herein can be used to enable an MPLS network to support multiple in-network services, such as, but not limited to, Network Service Header (NSH), In-situ Operations, Administration, and Maintenance (IOAM), Segment Routing (SR), and network programming. Beneficially, embodiments of the present technology can enable multiple in-network services to be stacked together. Further, embodiments of the present technology provide for backwards compatibility, if needed, e.g., for legacy routers that have not yet been updated to specifically function in accordance with the technology described herein. Further, certain embodiments of the present technology can be used to avoid or minimize the need for deep label stack scanning, which if not avoided can degrade performance by increasing latency. More specifically, certain embodiments of the present technology described herein are related to MPLS Extension Headers that provide for generic, scalable, high performance and future proof solutions to the above noted technical problems with MPLS.

Certain embodiments of the present technology are related to MPLS Extension Headers (which can also be referred to herein more succinctly as Extension Headers), and related metadata. An example of such embodiments is initially described with reference to FIG. 5, which illustrates an exemplary datagram 500 (or portion thereof) that includes Extension Headers and related metadata. Beneficially, embodiments of the present technology enable different types of Extension Headers to be stacked one above the other in a manner that enables multiple in-network services to be added to an MPLS network.

Figure 5:
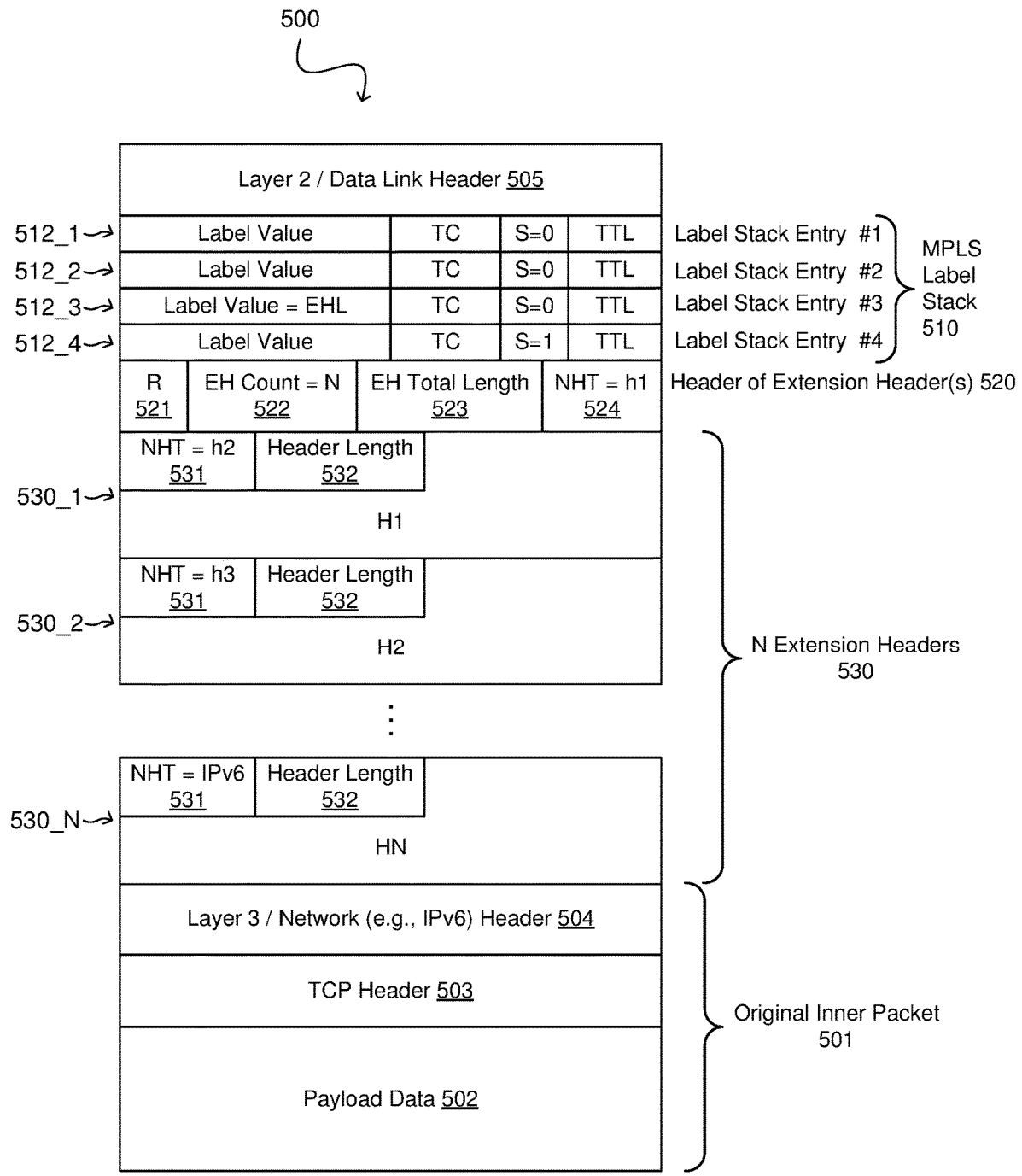
FIG. 5 shows an exemplary datagram that can be produced by a router of an MPLS network that implements certain embodiments of the present technology.

Referring to FIG. 5, the datagram 500 is shown as including an original data packet 501, which in this example is shown as including payload data 502, a Transmission Control Protocol (TCP) header 503, and a layer 3 (i.e., network layer) header 504, which can be, e.g., an IPv4 or IPv6 header, but is not limited thereto. This is just one example of an original data packet 501, which is not intended to be limiting. The original data packet 501 can also be referred to as the original inner packet 501, as shown in FIG. 5. The datagram 500 is also shown as including an MPLS label stack 510 (which can also be referred to as an MPLS header 510), a Header of Extension Headers (HEH) 520, and a plurality (i.e., N) Extension Headers 530. The datagram 500 is also shown as including a layer 2 (i.e., data link layer) header 505.

The MPLS label stack 510 in this example is shown as including four MPLS label stack entries 512_1, 512_2, 512_3, and 512_4, which are also labeled respectively label stack entries #1, #2, #3, and #4. The MPLS label stack entries 512_1, 512_2, 512_3, and 512_4 can be referred individually as a label stack entry 512, or more succinctly as a label 512. The MPLS label stack entries 512_1, 512_2, 512_3, and 512_4 can be referred to collectively as label stack entries 512, an MPLS label stack 510, or as an MPLS header 510. The label stack entries 512 are each shown as including a "Label Value" in their respective 20 bit label value field. Each "Label Value" in the 20 bit label value field of an MPLS label stack entry 512 can be a forwarding label (i.e., an address) of the next router (e.g., 210) in a Label Switched Path (LSP). It is also possible that one or more Label Value in the 20 bit label value field of an MPLS label stack entry 512 is one of the 8 special-purpose label values shown in Table 1 above, e.g., a GAL label.

The MPLS label stack entry 512_3 is shown as including an Extension Header Label (EHL) in its 20 bit label value field. In accordance with certain embodiments of the present technology, the EHL is assigned one of the 8 currently unallocated reserved special-purpose label values (i.e., is assigned one of the currently unassigned special-purpose label values 4, 5, 6, 8, 9, 10, 11, or 12). Whether the EHL will be assigned one of the 8 currently unallocated reserved special-purpose label values, and which specific one of the 8 currently unallocated reserved special-purpose label values is assigned to the EHL, will be up to the MPLS working group of the IETF. The inventors of the present technology believe that the use of MPLS Extension Headers, as described herein, is a significant enough use case to deserve one of the currently unassigned special-purpose label values.

In accordance with certain embodiments, the EHL is used to indicate that one or more Extension Headers 530 follow (i.e., are below) the MPLS Label Stack 510. In the embodiment shown, a Header of the Extension Header(s) (HEH) 520 is included between the MPLS Label Stack 510 (which can also be referred to as the MPLS Header 510) and the N Extension Header(s) 530, where N is an integer that is equal to or greater than 1.

Depending upon the specific MPLS implementation, as well as whether all the routers in a specific MPLS network have been updated to correctly identify and utilize the EHL, the EHL can be included in: the 20 bit label value field of the label stack entry 512 that is at the top of the MPLS Label Stack 510 (i.e., in the label stack entry #1, 512_1 in FIG. 5); the 20 bit label value field of the label stack entry 512 that is at the bottom of the MPLS Label Stack 510 (i.e., in the label stack entry #4, 512_4 in FIG. 5); or in the 20 bit label value field of one of the middle the label stack entries 512 in the MPLS Label Stack 510 (i.e., in the label stack entry #2 or #3, 512_2 or 512_3, in FIG. 5). In other words, the EHL can be included in any location in the MPLS Label Stack 510.

In the example shown in FIG. 5, the Extension Header Label (EHL) is included in the 20 bit label value field of one of the middle label stack entries 512 in the MPLS Label Stack 510, and more specifically, is included in the label stack entry #3, 512_3. Whenever the EHL is not included in the label stack entry at the top of the MPLS Label Stack 510, a router would need to scan the MPLS Label Stack 510 in order to determine that the EHL is included within the MPLS Label Stack 510.

If the EHL is included in the 20 bit label value field of the label stack entry 512 that is at the very top of the MPLS Label Stack 510 (i.e., if included in the 20 bit label value field of the label stack entry #1, 512_1), then the EHL can be quickly identified by a router (e.g., 210) that receives a datagram (e.g., 500) that includes the EHL and MPLS Extension Headers. However, in order for the EHL of a label stack entry 512 to be placed at the top of the MPLS Label Stack 510, then all routers within an MPLS network that may transport such a datagram would need to be updated to be able to interpret and use MPLS Extension Headers 530. Otherwise a router that has not been updated to identify the EHL and use MPLS Extension Headers would likely drop the datagram including the EHL and MPEL Extension Headers, and the original inner packet 501 may never make it to its intended destination.

In general, the EHL can be included in any location in the MPLS Label Stack 510, as noted above. However, in order for the use of the EHL to be backwards compatible with legacy routers that have not yet been updated to identify the EHL, the EHL should be located at the bottom of the MPLS Label Stack 510. For upgraded networks in which all routers have been updated to identify the EHL and use Extension Headers, the EHL can be included at any location in the stack. However, for performance reasons it would typically be better to locate the EHL at or close to the top of the MPLS Label Stack 510, in order to reduce or minimize how much scanning down of the MPLS Label Stack 510 is needed to be performed by a router.

The Header of the Extension Header(s) (HEH) 520 is shown as including four header fields, including a Reserved (R) field 521, an Extension Header Count (EH Count) field 522, an EH Total Length field 523, and a Next Header Type (NHT) field 524. The Next Header Type (NHT) field 524 can also be referred to more succinctly as the Next Header (NH) field 524. Although a specific order of the fields 521, 522, 523, and 524 of the HEH 520 is shown in FIG. 5, this is just an exemplary order which can be rearranged, and thus, the order of the fields 521, 522, 523, and 524 is not limited to the order shown in FIG. 5. The HEH 520 can also be referred to as the Extension Header(s) Header (EHH) 520, since it essential a header for the Extension Header(s) 530. Where a datagram includes a sequence of MPLS Extension Headers 530, as is the case in FIG. 5, the sequence can be referred to as an MPLS Extension Header list.

The Reserved (R) field 521 of the HEH 520 includes one or more bits (e.g., 4 to 6 bits) that are reserved for future use, and in certain embodiments can be eliminated. The EH Count field 522 includes a plurality of bits (e.g., 8 bits) that are used to specify the total number of Extension Headers 530 that follow the HEH 520. The EH Total Length field 523 includes a plurality of bits (e.g., 8 or 16 bits) that are used to specify total length of the Extension Headers 530. The value included within the EH Total Length field enables a router or other device to jump directly to the original inner packet 501 that follows the N Extension Headers 530 if desired. The Next Header Type (NHT) field 524 includes a plurality of bits (e.g., 8 bits) that are used to indicate the type of header that is included in the next Extension Header 530 or other next header. Exemplary types that may be specified by the NHT field 524 include, IOAM, NSH, and SR, but are not limited thereto. The NHT field 524 enables a router or other device to know how to interpret and use the next Extension Header 530 or other type of header within the datagram 500. The total length of the Header of the Extension Header(s) 520 can be the same length as each label stack entry 512 (i.e., 32 bits), or shorter or longer than the length of each label stack entry 512 (i.e., less than or greater than 32 bits). Accordingly, it should be appreciated that the widths of the various label stack entries, headers and other fields represented in FIG. 5 (as well as other FIGS.) are not drawn to scale.

In accordance with certain embodiments, values included in the EH Count field 522 are zero-based numbering values, such that a value of 0 means that there is 1 Extension Header 530 that follow the Header of the Extension Header(s) 520, a value of 1 means that there are 2 Extension Headers 530 that follow the Header of the Extension Header(s) 520, and more generally a value of M means that there are M+1 Extension Headers 530 that follow the Header of the Extension Header(s) 520. Similarly, the value included in the EH Total Length field 523 can also be a zero-based numbering value. In alternative embodiments, the values included the EH Count field 522 and/or the EH Total Length field 523 need not be zero-based numbering values.

Still referring to FIG. 5, each Extension Header 530 includes a Next Header Type (NHT) field 531, which is similar to the NHT field 524 included in the Header of the Extension Header(s) 520, in that it indicates the type of the next header. The next header can be an Extension Header 530, or some other type of header, such as a header (e.g., a network layer header 504) within the original inner packet 501. As noted above, exemplary types of next headers that can be specified by the NHT field 531 includes Network Service Header (NSH), In-situ Operations, Administration, and Maintenance (IOAM), Segment Routing (SR), and network programming, but are not limited thereto. Other exemplary next header types that can be specified by the NHT field 531 include IPv4, IPv6, none, and unknown, but are not limited thereto.

Each Extension Header 530 also includes a Header Length field 532, which specifies the length of the individual Extension Header. The Header Length field 532 enables a router to jump to the next header included in a datagram, if desired. Each NHT field 531 can be 8 bits, or some other number of bits, depending upon implementation. Each Header Length field 532 can be 8 bits, or some other number of bits, depending upon implementation. In FIG. 5, in each Extension Header 530 the NHT field 531 is shown as being located before the Header Length field 532, but this order can be reversed. It would also be possible for each Extension Header 530 to include one or more additional fields, and/or not include one or more fields discussed with reference to FIG. 5, depending on the specific implementation. The data fields and associated formats of the remaining portion of each respective Extension Header 530 is dependent upon the type of header thereof. For example, if the type of the Extension Header 530_1 is IOAM, then the data fields and associated format of the remaining portion of the Extension Header 530_1 may be in accordance with the standard for IOAM specified by the IETF. For another example, if the type of the Extension Header 530_2 is NSH, then the data fields and associated format of the remaining portion of the Extension Header 530_1 may be in accordance with the standard for NSH specified by the IETF.

In accordance with certain embodiments, the NHT field can have two special values, including a NONE value, and an UNKNOWN value. The NONE value means that there is no header and no payload following the header (i.e., there is no original inner packet 501 following the Extension Header 530) that includes the NHT field having the NONE value. The UNKNOWN value means that the type of header in the next header or payload is unknown. The special UNKNOWN value provides for compatibility with the original MPLS protocol design.

As shown above in Table 1, one of the MPLS label values that is reserved as a special-purpose label value is the value 15, which is reserved as the "Extension Label". The "Extension Label", also referred to as the "XL" or "XL(15)", is set aside for the purpose of extending the space of special-purpose labels. In accordance with certain embodiments, rather than using one of the 8 currently unallocated special-purpose reserved label values (i.e., one of the unassigned special-purpose values 4-6 and 8-12) within the label field of an MPLS label stack entry 512 to indicate that Extension Headers follow the MPLS Label Stack 510, the "Extension Label" can instead be used. In other words, a two-label scheme that includes XL(15) plus an Extension Header Label (EHL), can be used to indicate that one or more Extension Headers follow the MPLS Label Stack 510. Accordingly, such embodiments can be referred to as the XL(15)+EHL embodiments, or as the two-label scheme. For example, referring to FIG. 5, in order to implement an XL(15)+EHL embodiment, the EHL in the label field of the MPLS Header #3, 512_3 could be replaced with the special-purpose label value 15, and the label value in the label field of the MPLS Header #4, 512_4 should include the Extension Header Label (EHL). An additional MPLS Header would need to be added to the MPLS Label Stack 510, in FIG. 5, if three forwarding type addresses are to be specified by the MPLS Label Stack 510.

One advantage of using the two-label scheme just described above is that it does not require that one of the 8 remaining unallocated special-purpose MPLS label values 4-6 and 8-12 be allocated by the IETF. Thus, the two-label scheme would help preserve the scarce resources of the special-purpose MPLS label values, which are limited to a total of 16. However, the two-label scheme, because it requires two labels in the MPLS Label Stack (rather than one label in the MPLS Label Stack) to indicate that Extension Header(s) follow the MPLS Label Stack, would increase the size of the MPLS Label Stack by 32 bits compared to the scenario where the EHL was assigned to one of the 8 remaining unallocated special-purpose values 4-6 and 8-12. In other words, when using the two-label scheme, in order for the same information to be included within the MPLS Label Stack shown in FIG. 5, one additional label stack entry 512 (e.g., a label stack entry #5, 512_5, not shown in FIG. 5) would need to be added.

In still other embodiments, Forward Equivalent Class (FEC) is used to indicate whether MPLS Extension Header(s) follow the MPLS Label Stack. Forwarding Equivalence Class (FEC) is a term used in MPLS to describe a set of packets with similar or identical characteristics which may be forwarded the same way, i.e., they may be bound to the same MPLS label. More specifically, an FEC is a set of packets that a single router forwards to the same next hop, out the same interface (e.g., the same upstream port), with the same treatment (such as queuing). When using FEC to indicate the existence of Extension Header(s), for each forwarding next hop within an MPLS network, one of two potential label values (corresponding to the same next hop) is assigned by a router and included in the label value field of a label stack entry. The two label options (e.g., labels A and B) would have the same forwarding behavior, but only one of the two labels would specify that there is/are one or more Extension Header(s) in this MPLS data packet or datagram that should be processed. In other words, if there is no Extension Header in the packet or datagram being forwarded by the router, then a first one of the two label values (e.g., label A) is included in a label stack entry; and if there is/are one or more Extension Headers in the packet or datagram being forwarded (as added by the router, or by some other router), then a second one of the two label values (e.g., label B) is included in the label stack entry. The next hop router that receives that packet could then determine whether or not there is/are Extension Header(s) in the packet it receives based on whether the first or second label value (label value A or B) is included in the label value field of a label stack entry.

Assume for example that a label value A means "forward to router x" and label value B means "forwarding to router x and process Extension Header(s)". A router that is not capable of processing Extension Header(s) can still receive a packet with label value B. But in that case, the control plane would configure that router to make value B just mean "forward to x", so that the packet can be correctly forwarded. If a router is capable of processing Extension Headers, then the control plane will configure that router to make value B mean "forward to x and process Extension Header(s)", so the router, when seeing label value B, will do the proper processing of Extension Header(s).

The two labels in such embodiments are an FEC. Such embodiments would avoid the need for one of the 8 remaining unallocated special-purpose MPLS label values 4-6 and 8-12 to be allocated. However, the embodiments that use FEC would likely increase the complexity of the control plane of the MPLS network, e.g., because router tables would need to include two potential label values for each potential next hop in the MPLS network. Additionally, the embodiments that use FEC would limit the application potentials of the MPLS Extension Headers, e.g., because use of the FEC option would make it more difficult to add Segment Routing to an MPLS network.

Routers (e.g., 210) within an MPLS network can add an MPLS Label Stack (e.g., 510) to an original inner packet (e.g., 501). Routers (e.g., 210) can also perform a push operation to add an MPLS header to the MPLS Label Stack, a pop operation to remove an MPLS header from the MPLS Label Stack, or a swap operation to swap a label within an MPLS header with a new label. The same routers (e.g., 210) can also be used to add MPLS Extension Header(s) 530 and a Header of Extension Header(s) (HEH) 520 to an original inner packet 501, as well as to modify an MPLS Label Stack 510 (i.e., the MPLS header 510) to indicate the presence of MPLS Extension Header(s) 530 within the MPLS packet or datagram.

For example, referring briefly back to FIG. 1, a Label Edge Router (LER) (e.g., 210a) or a Label Switch Router (LSR) (e.g., 210b, 210c) can add one or more Extension Header(s) (e.g., 530) to a packet. An LER (e.g., 210a) could add the Extension Header Label (EHL) within an MPLS Label Stack (e.g., 510), add a Header of the Extension Header(s) (HEH) (e.g., 520), as well as add the one or more Extension Header(s) (e.g., 530) to the original inner packet (e.g., 501), when producing an MPLS packet. An LSR (e.g., 210b, or 210c) could add the Extension Header Label (EHL) within an MPLS Label Stack (e.g., 510), add a Header of the Extension Header(s) (HEH) (e.g., 520), as well as add one or more Extension Header(s) (e.g., 530) to an MPLS packet, e.g., to the MPLS packet produced by an LER (e.g., 210a). If an MPLS network is a software-defined network (SDN), the aforementioned actions can be initiated from a network controller (e.g., 212). However, it is noted that the MPLS network that implements MPLS Extension Headers in accordance with the embodiments described herein need not be an SDN.

Embodiments of the present technology described herein provide improvements to existing MPLS networks what are widely deployed throughout the world, but currently have certain limitations that embodiments of the present technology can be used to overcome. More specifically, MPLS networks are not able to support multiple in-network services, such as, but not limited to, NSH, IOAM, SR, and network programming. Further, embodiments of the present technology add such capabilities to MPLS networks in an efficient manner by adding such capabilities without adding extensive overhead to MPLS packets.

Figure 6:
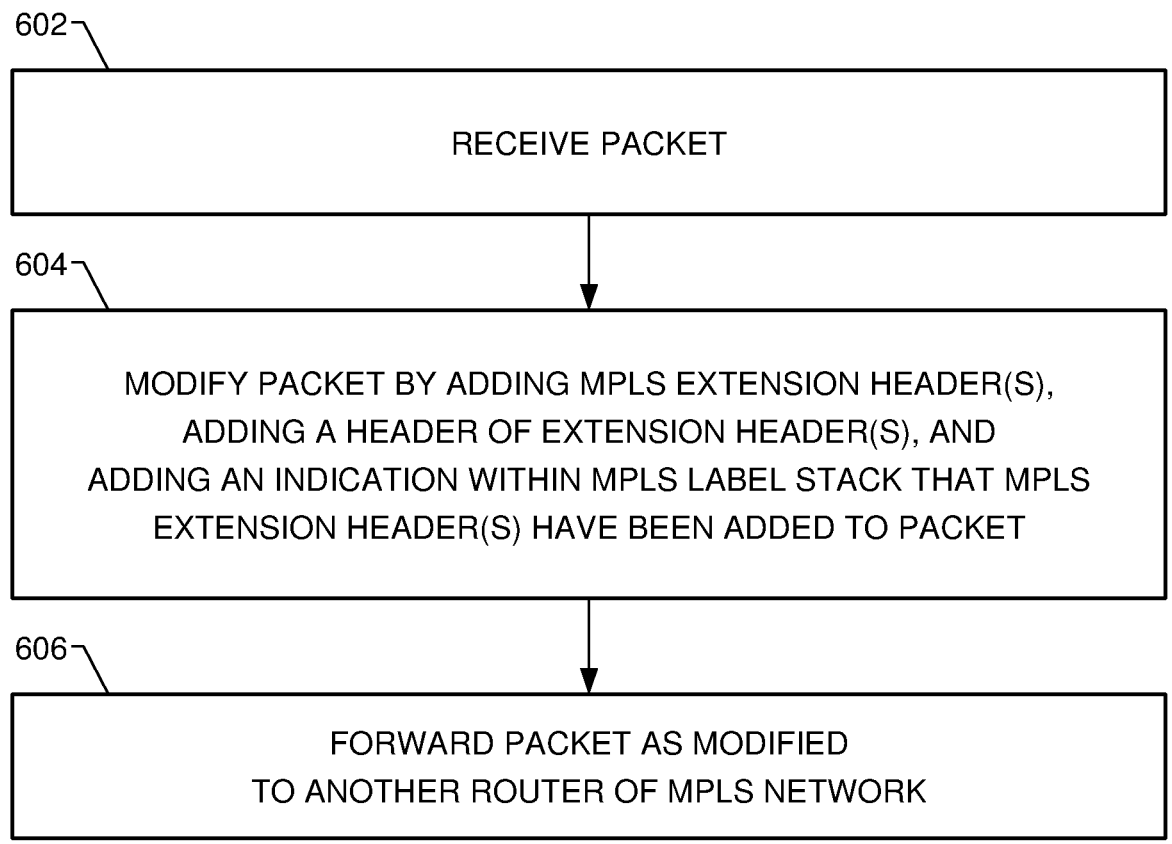
FIGS. 6 and 7 are high level flow diagrams that are used to summarize methods according to certain embodiments of the present technology.
Figure 7:
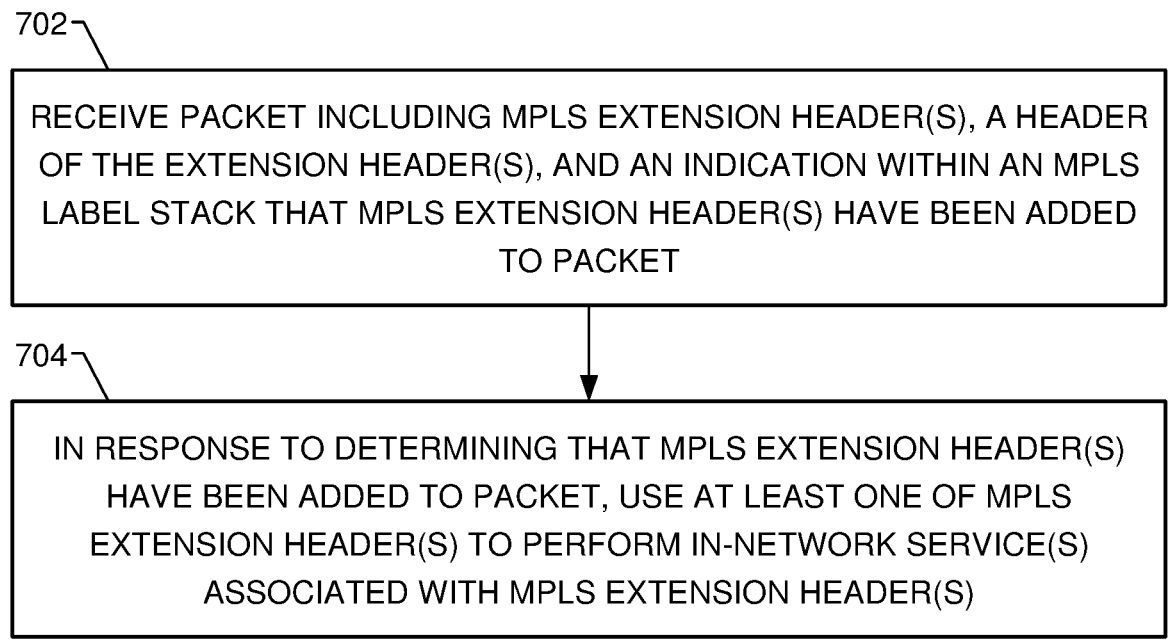

The high level flow diagrams of FIGS. 6 and 7 will now be used to summarize methods according to certain embodiments of the present technology. Such methods can be used to add one or more in-network services to a multiprotocol label switching (MPLS) network.

Referring to FIG. 6, step 602 involves a router of the MPLS network receiving a packet. Step 604 involves the router of the MPLS network modifying the packet by adding one or more MPLS extension headers, adding a header of the extension header(s), and adding an indication within an MPLS label stack that one or more MPLS extension headers have been added to the packet. An exemplary packet or datagram resulting from the modifications performed at step 604 is shown in and discussed above with reference to FIG. 5. Step 606 involves the router of the MPLS network forwarding the packet as modified to another router of the MPLS network. One of the routers 210, discussed above with reference to FIGS. 2 and 3, can be used to perform steps 602, 604, and 606.

At least one of the one or more MPLS extension headers, which is/are added to a packet at step 604, can support an in-network service that is not otherwise supported by the MPLS network. For example, in-network services that the method can add to an MPLS network include, but are not limited to: network service header (NSH), in-situ operations, administration, and maintenance (IOAM), segment routing (SR), and network programming.

One or more MPLS Extension Headers can be added or removed anywhere in an MPLS network, i.e., by various different routers (e.g., 210 in FIG. 2) within the MPLS network. If an MPLS Extension Header to be added to a packet is the first MPLS Extension Header being added to the packet, then an Extension Header Label (EHL), the Header of the Extension Header(s) (HEH), and the MPLS Extension Header needs to be added to the packet. If an MPLS Extension Header to be added is not the first MPLS Extension Header added to a packet (i.e., if at least one MPLS Extension Header has already been added to a packet and is still added to the packet), then the MPLS Extension Header just needs to be chained in an MPLS Extension Header list (e.g., 530 in FIG. 5). If an MPLS Extension Header to be removed is the only (or last remaining) MPLS Extension Header, then the Extension Header Label (EHL), the Header of the Extension Header(s) (HEH), and the MPLS Extension Header all need to be removed from the packet. If an MPLS Extension Header to be removed is not the last MPLS Extension Header, then the MPLS Extension Header just needs to be removed from the MPLS Extension Header list while the EHL, HEH, and the other MPLS Extension Header(s) remain.

In accordance with certain embodiments, such as those described above with reference to FIG. 5, the HEH, which is added by a router, includes a field that specifies a total number of MPLS extension headers added to the packet, a field that specifies a total length of the MPLS extension header(s) included in the packet as modified, and a field that specifies a type of the next header included in the packet as modified, as noted above. As also described above with reference to FIG. 5, each MPLS extension header, of the one or more MPLS extension headers added by the router, includes a field that specifies a type of the next header included in the packet as modified, and a field that specifies a length of the MPLS extension header. The type of the next header that is specified in the header of the extension header(s), and the type of the next header that is specified in each MPLS extension header, can be any of the following, but are not limited thereto: network service header (NSH), in-situ operations, administration, and maintenance (IOAM), segment routing (SR), Internet Protocol version 4 (IPv4), Internet Protocol version 6 (IPv6), none, and unknown. Where a field that specifies the type of the next header includes a none indication, this indicates that there is no next header. Where a field that specifies the type of the next header includes an unknown indication, this indicates that the type of the next header is unknown.

An MPLS label stack (e.g., 510 in FIG. 5), which can also be referred to as the MPLS header, includes a plurality of MPLS label stack entries. In accordance with certain embodiments, the indication within the MPLS label stack, that one or more MPLS extension headers have been added to the packet, comprises an extension header label (EHL) within a label value field within one of the plurality of MPLS label stack entries included in the MPLS label stack. More specifically, in certain embodiments, the EHL comprises one of sixteen special-purpose label values that are reserved by the MPLS working group of the Internet Engineering Task Force (IETF). In accordance with alternative embodiments, another one of the plurality of MPLS label stack entries included within the MPLS label stack includes a special-purpose label value of 15, which is reserved the MPLS working group of the Internet Engineering Task Force (IETF) to indicate that an Extension Label is included in the MPLS label stack, and thereby enables the router to identify the EHL. In still other embodiments, a forward equivalent class (FEC) is used to indicate that one or more MPLS extension headers follow the MPLS label stack.

Where the router that modifies the packet (at step 604) comprises a label edge router (LER), e.g., 210*a* in FIG. 2, the packet that is modified by the LER comprises an original inner packet, and the LER adds the MPLS label stack to the original inner packet.

Where the router that modifies the packet comprises a label switch router (LSR), e.g., 210*b* or 210*c* in FIG. 2, the packet that is modified by the LSR comprises an MPLS packet that already includes the MPLS label stack or at least a portion thereof.

Referring now to FIG. 7, step 702 involves a router of the MPLS network receiving a packet that already includes one or more MPLS extension headers, a header of the extension header(s), and an indication within an MPLS label stack that one or more MPLS extension headers have been added to the packet. Still referring to FIG. 7, step 704 involves the router of the MPLS network, in response to determining that one or more MPLS extension headers have been added to the packet, using at least one of the one or more MPLS extension headers to perform one or more in-network services associated with the at least one of the one or more MPLS extension headers. The router can determine that one or more MPLS extension headers have been added to the packet by detecting the EHL at the top of the MPLS Label Stack, or scanning the MPLS Label Stack, as was explained above in more detail. Other variations are possible, as explained above, such as the use of an FEC. At least one of the MPLS extension headers can support an in-network service that is not otherwise supported by the MPLS network, such as, network service header (NSH), in-situ operations, administration, and maintenance (IOAM), segment routing (SR), and/or network programming.

Segment Routing

Figure 8:
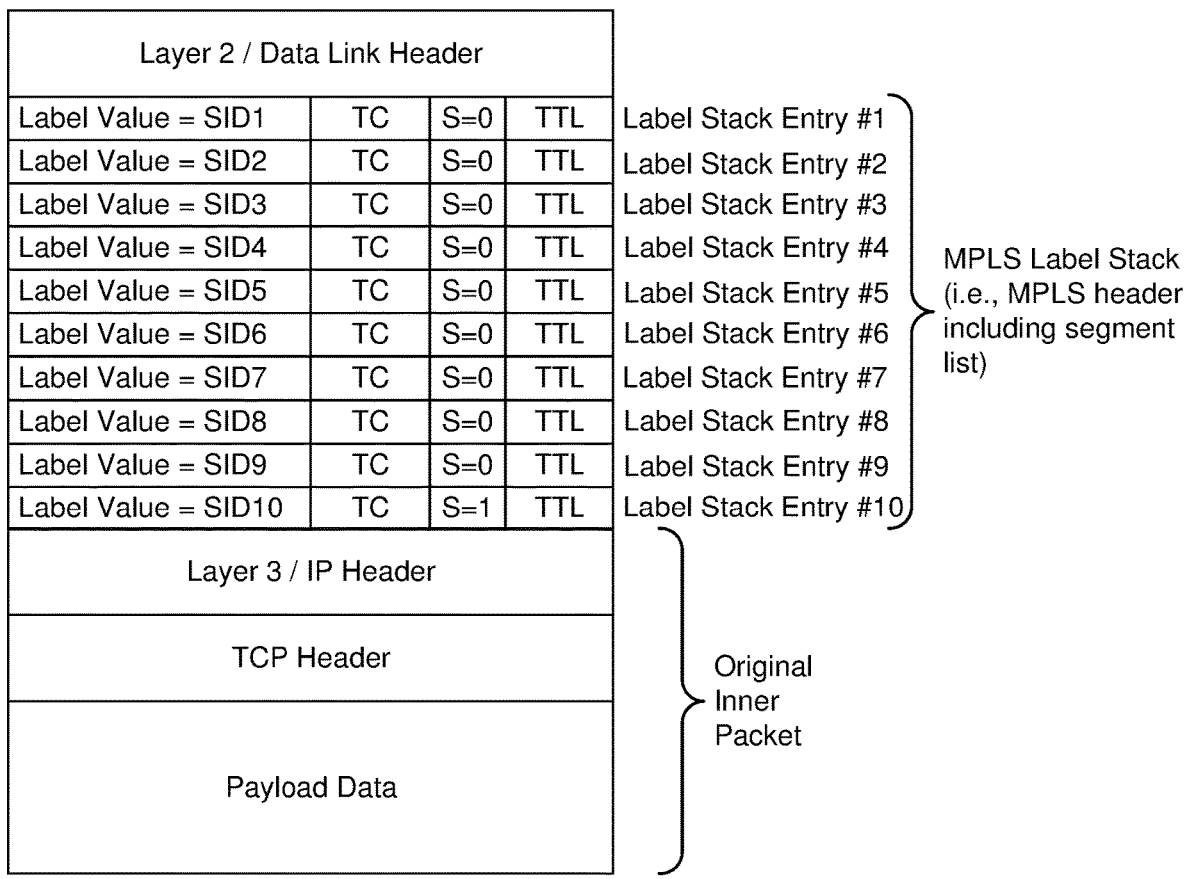
FIG. 8 shows an exemplary datagram for use in a conventional SR-MPLS network.

As noted above, Segment Routing (SR) can work on top of an MPLS network, and when SR is applied to an MPLS network, it is often referred to as MPLS Segment Routing, or SR-MPLS in short. Conventionally, when SR is used in an MPLS network, segments are encoded as MPLS labels within the MPLS label stack (also known as the MPLS header) of a packet. More specifically, conventionally, when SR is used in an MPLS network, the label value (within the label value field) of a label stack entry indicates a segment identifier (SID), and the depth of the MPLS label stack (which is also known as an MPLS header) depends on how many segments are included in a routing path between a source node and a destination node. This is because in conventional SR-MPLS, the segment list is included in the MPLS header. Accordingly, with conventional SR-MPLS, if a path includes ten (10) segments, then the MPLS header (also known as the MPLS label stack) must include at least ten (10) label stack entries, with each of the ten label stack entries including a segment identifier (SID). An example of a datagram having an MPLS header including SIDs for ten (10) segments is illustrates in FIG. 8. Such a deep MPLS label stack (which in this example includes a SID label stack) can hurt the forwarding performance when the bottom of MPLS label stack needs to be accessed and/or deep packet inspection needs to be performed. For example, network load balancing based on an entropy label or an IP header, and other network services such as IOAM, often rely on headers deeply embedded in a packet. A deep MPLS label stack is unfavorable in such occasions.

Further, as noted above, when using conventional SR-MPLS, the compactness of an MPLS label stack entry (also referred to more succinctly as an MPLS label) is a double-edge sword. While it beneficially helps to reduce the header overhead, it unfortunately leaves no room to encode extra information other than the SID. Because of this, a noticeable missing feature of conventional SR-MPLS is network programming, which is a powerful feature of SRv6. Certain embodiments of the present technology, which are described below, utilize an MPLS Extension Header, details of which were introduced above, to overcome certain deficiencies of conventional SR-MPLS. Such embodiments not only retain the advantages of implementing SR in an MPLS network (as opposed to in an IPv6 network), but also overcome certain drawbacks associated with conventional SR-MPLS. This is achieved by keeping the SID label stack within an extension header, as will be described below.

Figure 9:
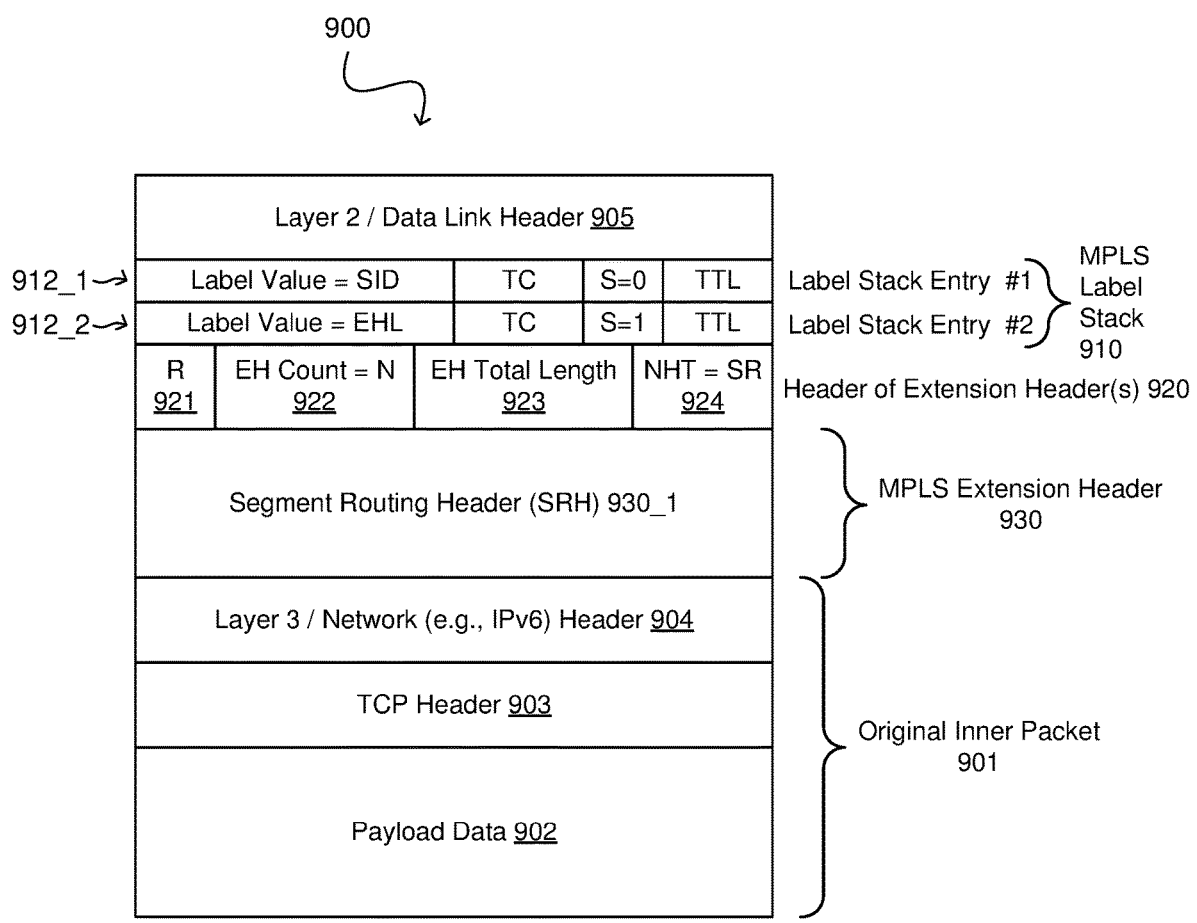
FIG. 9 shows an exemplary datagram that can be produced by a router of an MPLS network that implements certain embodiments of the present technology that can be used to perform segment routing (SR) over the MPLS network.

In accordance with certain embodiments described herein, a SID label stack is kept in an MPLS Extension Header. Further, in accordance with certain embodiments described herein, only the current SID label is copied to the top of the MPLS label stack. The term "current SID" as used herein refers to the segment identifier (i.e., the SID) of the segment over which a router (that is presently handling a packet) will forward the packet. An example of the packet format is shown in FIG. 9. More specifically, FIG. 9 shows an exemplary datagram 900 that can be produced by a router of an MPLS network that implements certain embodiments of the present technology that can be used to perform segment routing (SR) over an MPLS network. It is noted that the phases "in a network" (e.g., in an MPLS network) and "over a network" (e.g., over an MPLS network) are used interchangeably herein.

Referring to FIG. 9, the datagram 900 is shown as including an original data packet 901, which in this example is shown as including payload data 902, a Transmission Control Protocol (TCP) header 903, and a layer 3 (i.e., network layer) header 904, which can be, e.g., an IPv4 or IPv6 header, but is not limited thereto. This is just one example of an original data packet 901, which is not intended to be limiting. The original data packet 901 can also be referred to as the original inner packet 901, as shown in FIG. 9. The datagram 900 is also shown as including an MPLS label stack 910 (which can also be referred to as an MPLS header 910), a Header of Extension Header(s) (HEH) 920, and an MPLS Extension Header 930 (which can also be referred to more succinctly as an Extension Header 930). The Extension Header 930 is one example of the Extension Headers 530 introduced above in the discussion of FIG. 5. The datagram 900 is also shown as including a layer 2 (i.e., data link layer) header 905.

The MPLS label stack 910 in this example is shown as including two MPLS label stack entries 912_1 and 912_2, which are also labeled respectively label stack entries #1 and #2. The MPLS label stack entries 912_1 and 912_2 can be referred individually as a label stack entry 912, or more succinctly as a label 912. The MPLS label stack entries 912_1 and 912_2 can be referred to collectively as label stack entries 912, labels 912, an MPLS label stack 910, or as an MPLS header 910. The label stack entries 912 are each shown as including a "Label Value" in their respective 20 bit label value field. In the example show in FIG. 9, the Label Value included in the label stack entry 912_1 is a segment identifier (SID) for use in segment routing, and the Label Value in the label stack entry 912_2 is an Extension Header Label (EHL). Each label stack entry is also shown as including a 3 bit Traffic Class (TC) field, a 1 bit Bottom of Stack (S) field, and an 8 bit Time-To-Live (TTL) field, the uses and contents of which were described above with reference to FIG. 4A, and thus, need not be repeated.

In certain embodiments, the EHL is assigned one of the 8 currently unallocated reserved special-purpose label values (i.e., can be assigned one of the currently unassigned special-purpose label values 4, 5, 6, 8, 9, 10, 11, or 12), as was explained above in the discussion of FIG. 5. Alternatively, as was also discussed above, in alternative embodiments, a further MPLS label stack entry 912 included within the MPLS label stack 910 includes the special-purpose label value of 15, which is reserved the MPLS working group of the IETF to indicate that an Extension Label is included in the MPLS label stack, and thereby enables the router to identify the EHL within one of the label stack entries 912. In still other embodiments, a Forward Equivalent Class (FEC) can be used to indicate whether MPLS Extension Header(s) follow the MPLS Label Stack.

In FIG. 9, the EHL is used to indicate that one or more Extension Headers follow (i.e., are below) the MPLS Label Stack 910 (also known as the MPLS Header 910). A Header of the Extension Header(s) (HEH) 920 is included between the MPLS Label Stack 910 (which can also be referred to as the MPLS Header 910), and one or more MPLS Extension Header(s) 930 are included below the HEH 920. In FIG. 9, only one Extension Header 930 is shown below the HEH 930. However, one or more additional Extension Headers can be included below the HEH 930, e.g., as was described above with reference to FIG. 5. In other words, while only an SRH type MPLS Extension Header 930_1 is shown in the exemplary datagram 900 in FIG. 9, one or more additional MPLS Extension Headers (in addition to the SRH type MPLS Extension Header 930_1) can be included in the datagram 900, either below and/or above the SRH type MPLS Extension Header 930_1. The SRH type MPLS Extension Header 930_1 adds a segment routing (SR) type service to the underlying MPLS network. Other types of MPLS Extension Headers can add other types of in-network services to the underlying MPLS network, as was described above with reference to FIGS. 5-7. Examples of the other types in-network services that MPLS Extension Headers can be used to add to an MPLS network, include, but are not limited to, a network service header (NSH) service, or an in-situ operations, administration, and maintenance (IOAM) service, as was explained above.

The Header of the Extension Header(s) (HEH) 920 is shown as including four header fields, including a Reserved (R) field 921, an Extension Header Count (EH Count) field 922, an EH Total Length field 923, and a Next Header Type (NHT) field 924. The Next Header Type (NHT) field 924 can also be referred to more succinctly as the Next Header (NH) field 924. The use and contents of the fields 921, 922, 923, and 924 of the HEH 920 are the same respectively as the use and contents of the commonly named fields 521, 522, 523, and 524 of the HEH 520 described above with respect to FIG. 5, and thus need not be described again. As was also the case in the discussion of the HEH 520 in FIG. 5, although a specific order of the fields 921, 922, 923, and 924 of the HEH 920 is shown in FIG. 9, this is just an exemplary order which can be rearranged, and thus, the order of the fields 921, 922, 923, and 924 is not limited to the order shown in FIG. 9. In FIG. 9, the Next Header Type (NHT) field 924 specifies that the next type of header is a segment routing (SR) header. In other words, in FIG. 9, the NHT field 924 specifies that the MPLS Extension Header 930 is an SR header, which can also be referred to using the acronym SRH. In FIG. 9, the SRH is labeled 930_1. Since the SRH 930_1 is a type of MPLS Extension Header, the SRH 930_1 can also be referred to more specifically as an SRH type MPLS Extension Header 930_1.

Figure 10:
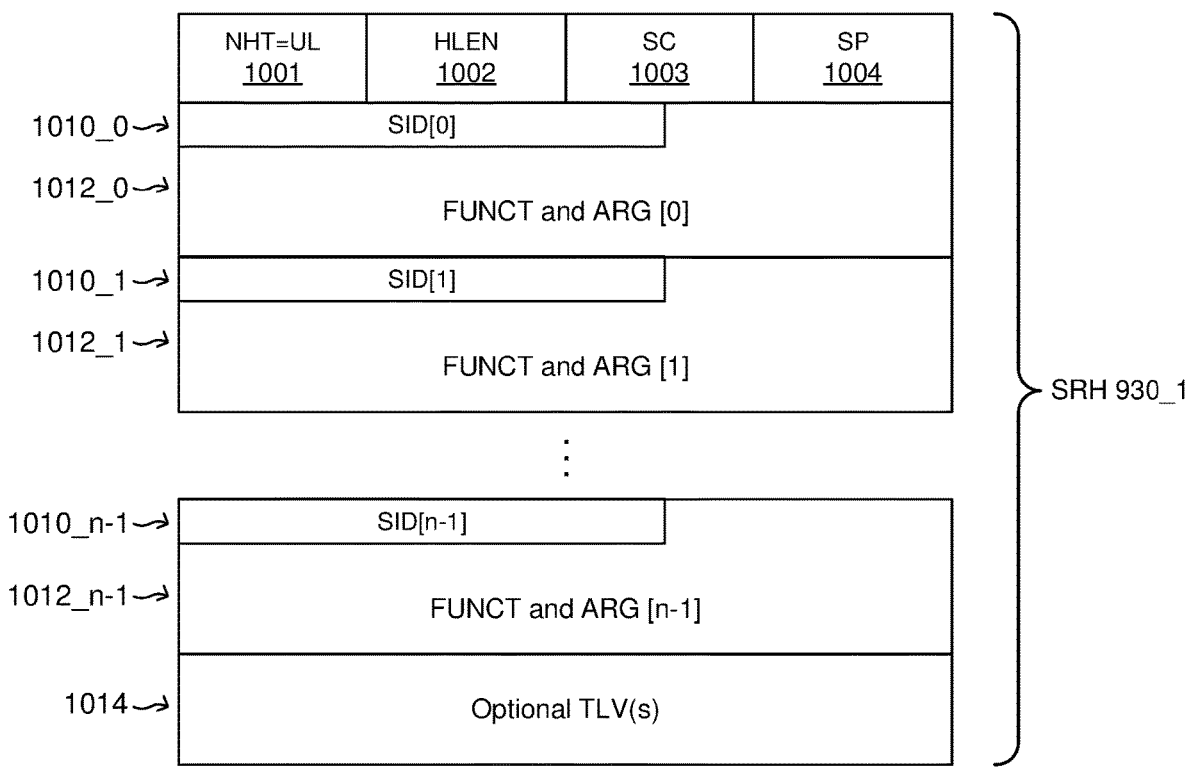
FIG. 10 shows the format of a segment routing header (SRH) type of MPLS Extension Header, according to certain embodiments of the present technology.

The format of an SRH (e.g., 930_1 in FIG. 9), according to certain embodiments of the present technology, is shown in FIG. 10. Referring to FIG. 10, the SRH is shown as including a Next Header Type (NHT) field 1001, a header length (HLEN) field 1002, a Segment Count (SC) field 1003, and a Segment Pointer (SP) field 1004. In accordance with certain embodiments, each of the fields 1001, 1002, 1003 and 1004 is 8 bits in length (i.e., one octet). In other embodiments, the fields 1001, 1002, 1003, and/or 1004 can have other lengths, and the lengths of such field need not all be the same. The fields 1001, 1002, 1003, and 1004 include metadata for the SRH, and thus, can be collectively referred to as metadata fields. Additional details of each of these fields are provided below. Although a specific order of the fields 1001, 1002, 1003, and 1004 of the SRH is shown in FIG. 10, this is just an exemplary order which can be rearranged, and thus, the order of the fields 1001, 1002, 1003, and 1004 is not limited to the order shown in FIG. 10.

The NHT field 1001, which can also be referred to as the next header (NH) field 1001, is used in the same manner of the NHT fields 524 and 531 discussed above with reference to FIG. 5, i.e., to indicate the type of the next header included within a packet or datagram. The next header can be, e.g., a further MPLS Extension Header, or can be a header of the original inner packet 901 (e.g., an IPv6 header), but is not limited thereto.

The HLEN field 1002 is used to indicate the total length of the segment routing header (SRH), which is labeled 930_1 in FIG. 10. The value included within HLEN field enables a router or other device to jump directly to the header of the next MPLS Extension Header (if there is one), or directly to the original inner packet 901 that follows Extension Header(s) 930, if desired.

The SC field 1003 is used to indicate the total number of SIDs included in the SRH, and thus, the total number of SIDs in the segment list. In accordance with certain embodiments, the value included the SC field 1003 is specified by an 8 bit unsigned integer.

The SP field 1004 stores a pointer value that is used to indicate the current SID in the segment list. In accordance with certain embodiments, the value included in the SP field 1004 is a zero-based 8 bit value.

Still referring to FIG. 10, the SRH 930_1 is also shown in including a plurality of SIDs labeled 1010_0, 1010_1, . . . 1010_n-1, which can be referred to collectively as a SID list, or equivalently as a SID label stack. The SIDs 1010_0, 1010_1, . . . 1010_n-1 can be referred to individually as a SID 1010. As can be appreciated from a comparison between the format shown collectively in FIGS. 9 and 10, and the format shown in FIG. 8 (which is used in conventional SR-MPLS), in the embodiments described with reference to FIGS. 9 and 10 the SID list (also referred to as the SID label stack) is included within the SRH 930_1 (which is a type of MPLS Extension Header), rather than in the MPLS Header (as was the case in FIG. 8). Thus, the embodiments of the present technology shown in and described with reference to FIGS. 9 and 10 can be used to achieve SR-MPLS using an MPLS Header (also known as an MPLS Label Stack) that is smaller (and more specifically, less deep) than is achievable using conventional SR-MPLS.

In accordance with certain embodiments, each SID 1010 in the SID list is a 20 bit value. Accordingly, each SID 1010 includes the same number of bits (i.e., has the same length) as each Label Value that is included in the label value field of each label stack entry 912. This enables individual SIDs 1010 to be copied into the label value field of a label stack entry 912 within the MPLS header 910. It would also be possible for each SID to be a value that is greater than 20 bits, e.g., by using the bits typically reserved for the TC, S and/or TTL bits for use in specifying a SID.

Following each SID 1010 is a respective function and argument field 1012, which can be used to specify instructions and parameters for network programming associated with the segment specified by the SID 1010. In accordance with certain embodiments, each function and argument field 1012 is 108 bits in length. In alternative embodiments, each function and argument field 1012 can have some other length. In accordance with certain embodiments, a network operator can decide how the function and argument field 1012 is partitioned. In other words, a network operator is free to partition the function and argument field 1012 to encode one or more functions and parameters at a segment.

In accordance with the embodiments described with reference to FIGS. 9 and 10, the SID label stack is kept in an MPLS Extension Header (e.g., 930_1), and more specifically, within the SRH type of MPLS Extension Header. In such embodiments, only the current SID label is copied to the top of the MPLS label stack 910.

Still referring to FIG. 10, the SRH 930_1 is also shown in including an optional Type-Length-Value field 1014. The TLV field 1014 can include sub-fields and can be used to encode optional information. The sub-fields can include Type, Length and Value sub-fields. In accordance with an embodiment, the Type and Length can be fixed in size, and the Value can be of variable size. The Type can be a binary code, e.g., a simply alphanumeric, which indicates the kind of field that this part of the message represents. The Length can specify the size of the Value. The Value can be a variable-sized series of bytes which contains data for this part of a message. While only one optional TLV field 1014 is shown in FIG. 10, more than one TLV field 1014 can be included in a datagram. Beneficially, TLV sequences can be easily searched using generalized parsing functions. New message elements which are received at an older node can be safely skipped and the rest of the message can be parsed.

Now that the format of an SRH type MPLS Extension Header has been described, details of segment routing data plane processing will be described. In accordance with certain embodiments of the present technology, it is the SR source node that generates the SRH (e.g., 930_1). Depending upon where the SR domain of the MPLS network begins, the SR source node can be an ingress router (i.e., a Label Edge Router (LER)) of an MPLS network, or the SR source node can be a label switch router (LSR) (i.e., a transit node) of the MPLS network. For example, the router of the MPLS network that generates the SRH can be the router (e.g., 210a) that receives the original inner packet from a device (e.g., 202) that generated the payload data of the original inner packet, assuming that router is within the SR domain of the MPLS network. Alternatively, an intermediate router (e.g., 210b, or 210c) that is being used to transport a packet to its destination can generate the SRH, where the intermediate router is at the edge of the SR domain of the MPLS network, but the ingress router was not part of the SR domain.

In certain embodiments, the SR source node that generates the SRH initializes the Segment Pointer field of the SRH to 0. Additionally, the SR source node inserts the SRH into an MPLS packet as an MPLS Extension Header. The SID pointed to by the Segment Pointer (initially the SID[0]) in the SRH type MPLS Extension Header is then copied into an MPLS label stack entry of the MPLS header so that the SID is in the top label stack entry (i.e., at the top of the MPLS label stack). The TTL field in the label stack entry is initialized to a configured value. The packet is then forwarded based on the top label, i.e., based on the SID included in the top label stack entry.

Figure 11:
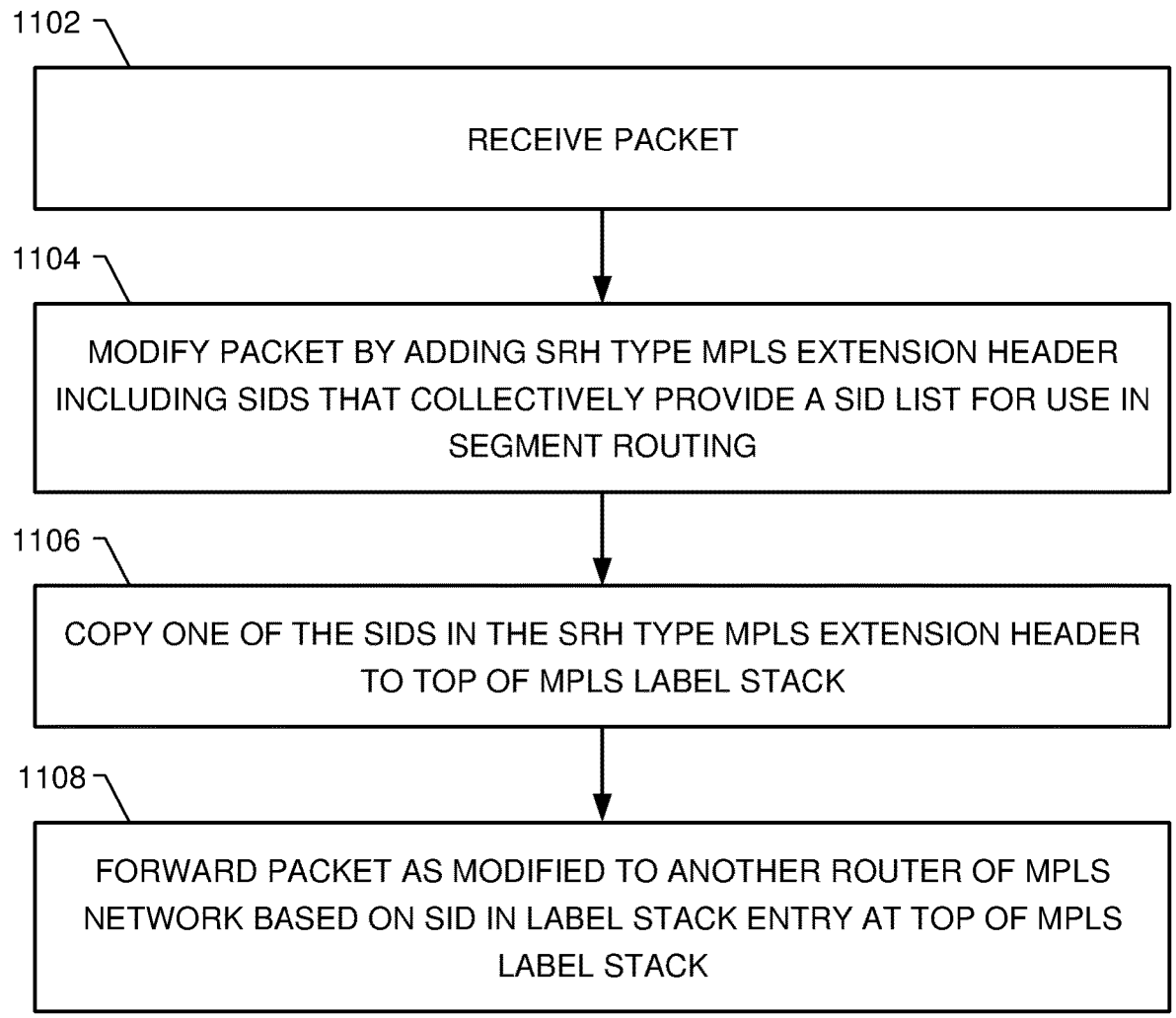
FIG. 11 is a high level flow diagram that is used to summarize methods, according to certain embodiments of the present technology, which can be performed by a segment router source node of an MPLS network.

Certain features described above are summarized with reference to FIG. 11. More specifically, FIG. 11 is a high level flow diagram that is used to summarize methods, according to certain embodiments of the present technology, which can be performed by a segment router source node (e.g., 210a in FIG. 2) of an MPLS network. Referring to FIG. 11, step 1102 involves a router of the MPLS network receiving a packet. An example of a packet that may be received at step 1102 is the original inner packet 901 shown in FIG. 9.

Referring again to FIG. 11, step 1104 involves the router modifying the packet by adding a segment routing header (SRH) type MPLS extension header, the SRH type MPLS extension header including one or more segment identifiers (SIDs) that collectively provide a SID list for use in segment routing. An exemplary SRH type MPLS extension header that can be added to a packet at step 1104 is labeled 930_1 in FIG. 9, and exemplary details of such an SRH type MPLS extension header are shown in and described above with reference to FIG. 10.

Step 1106 involves the router copying one of the one or more SIDs in the SRH type MPLS extension header to a top of an MPLS label stack. Referring briefly back to FIGS. 9 and 10, step 1106 can involve, e.g., the router causing the SID[0] in FIG. 10 (labeled 1010_0) to be in the label stack entry #1 in FIG. 9 (labeled 912_1), so that the label value in the label stack entry #1 is the SID[0].

Step 1108 involves the router forwarding the packet as modified to another router of the MPLS network based on the SID included in the label stack entry at the top of the MPLS label stack. Continuing with the above example, step 1108 can involve the router forwarding the packet as modified based on the SID[0] that is within the label value field of the label stack entry 912_1 at the top of the MPLS label stack 910 in FIG. 9.

The SRH type MPLS extension header added to the packet by the router at step 1104 can also include an NHT field, a HLEN field, an SC field, and an SP field, as was discussed above. Content of the NHT field specifies a type of a next header included in the packet as modified. Content of the HLEN field specifies a length of the SRH type MPLS extension header. Content of the SC field specifies a total number of SIDs in the SRH type MPLS extension header. Content of the SP field specifies which SID within the SRH type extension header is included in the label stack entry at the top of the MPLS label stack.

The SRH type MPLS extension header added to the packet by the router at step 1104 can includes a separate corresponding function and argument field (e.g., 1012 in FIG. 10) for each SID of the SID(s) included in the SRH type MPLS extension header (e.g., 930_1 in FIG. 10). Content of the corresponding function and argument field can include instructions and parameters for use in network programming associated with a segment specified by the SID. The network programming represents a capability of a network to encode a network program into individual network instructions (i.e., functions) which are then inserted into a packet's header. Such network instructions can, e.g., be performed to select a low latency path over an entire network. Along with segment addressing, network instructions define a particular task (function) for each segment node in the SR network.

The modifying of the packet by the router at step 1104 can also involve the router adding an indication within the MPLS label stack (e.g., 910) that one or more MPLS extension headers (e.g., 930) have been added to the packet. The indication within the MPLS label stack that one or more MPLS extension headers have been added to the packet can be an extension header label (EHL) within a label value field within one of the plurality of MPLS label stack entries included in the MPLS label stack. For example, the EHL can be one of sixteen special-purpose label values that are reserved by the MPLS working group of the IETF. Alternatively, included within another the plurality of MPLS label stack entries of the MPLS label stack can be a special-purpose label value of 15, which is reserved by the MPLS working group of the Internet IETF to indicate that an Extension Label is included in the MPLS label stack and enables the router to identify the EHL. In still other embodiments, a Forward Equivalent Class (FEC) can be used to indicate whether MPLS Extension Header(s) follow the MPLS Label Stack.

Figure 12:
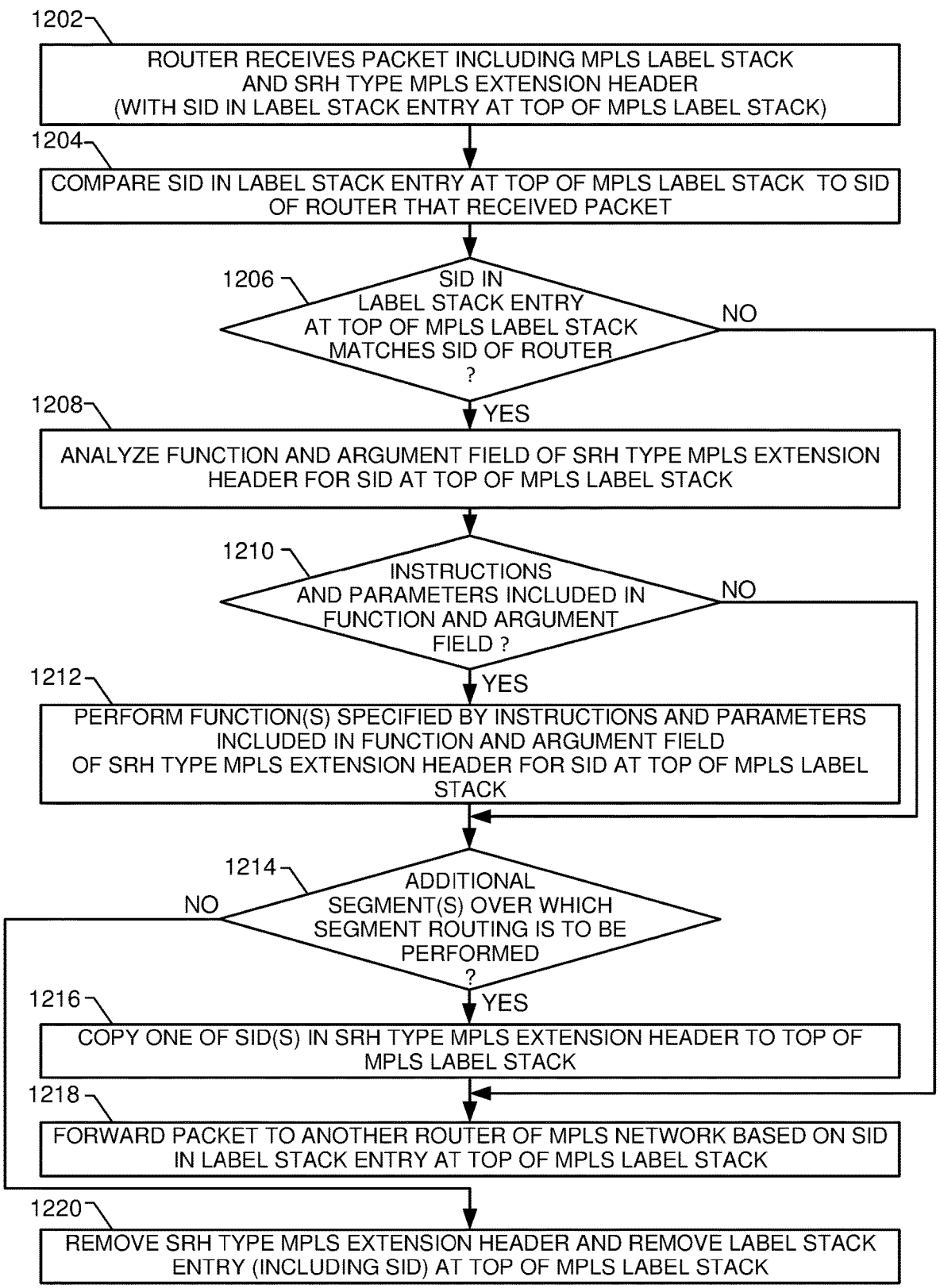
FIG. 12 is a high level flow diagram that is used to summarize methods, according to certain embodiments of the present technology, which can be performed by a segment router intermediate node of an MPLS network.

The high level flow diagram of FIG. 12 will now be used to summarize methods, according to certain embodiments of the present technology, which can be performed by a segment router intermediate node (e.g., router 210b or 210c in FIG. 2) of an MPLS network. Referring to FIG. 12, step 1202 involves a router of the MPLS network receiving a packet including an MPLS label stack and a segment routing header (SRH) type MPLS extension header. An example of a packet that can be receive at step 1202 is the datagram 900 shown in FIG. 9, additional details of which are shown in FIG. 10. More specifically, the packet received at step 1202 can include the MPLS label stack (also known as an MPLS header) that includes a plurality of label stack entries, with a label stack entry at a top of the MPLS label stack including a SID used to forward the packet to the router. Additionally, the packet received at step 1202 includes the SRH type MPLS extension header (e.g., 930_1 in FIGS. 9 and 10) including one or more SIDs that collectively provide a SID list for use in segment routing of the received packet.

Still referring to FIG. 12, at step 1204 the router 1204 (which received the packet at step 1202) compares the SID in the label stack entry at the top of the MPLS label stack to the SID of the router that received the packet. At step 1206, based on the comparison performed at step 1206, there is a determination of whether the SID in the label stack entry at the top of the MPLS label stack matches the SID of the router. In other words, steps 1204 and 1206 are performed to determine whether the SID in the top label matches the local SID. If the answer to the determination at step 1206 is No (e.g., because the router is not a segment), then flow goes to step 1218 and the packet is forwarded to another router based on the SID in the label stack entry at the top of the MPLS label stack. If the answer to the determination at step 1206 is Yes, then flow goes to step 1208. While shown as two separate steps in FIG. 12, steps 1204 and 1206 can be combined into a single step.

At step 1208 the router analyzes the function and argument field (e.g., 1010 in FIG. 10) of the SRH type MPLS extension header for the SID in the label stack entry at the top of the MPLS label stack. At step 1210, based on the analysis performed at step 1208, there is a determination of whether instructions and parameters are included in the function and argument field of the SRH type MPLS extension header for the SID in the label stack entry at the top of the MPLS label stack. If the answer to the determination at step 1210 is No, then flow goes to step 1214. If the answer to the determination at step 1210 is Yes, then flow goes to step 1212. While shown as two separate steps in FIG. 12, steps 1208 and 1210 can be combined into a single step.

At step 1212, the router performs one or more functions that is/are specified by instructions and parameters included in the function and argument field of the SRH type MPLS extension header for the SID at the top of the MPLS label stack. The function(s) performed at step 1212 can be, e.g., any node specific functions that can be executed by a router. Node specific functions that can be performed by a router include, e.g., those define by SRv6 for end nodes, such as, but not limited to, End, End.X, End.B6, End.B6.Encaps, End.DX6, End.DX4, End.DT6, End.DT4, End.DX2, but are not limited thereto.

At step 1214, the router determines whether there is at least one additional segment over which segment routing is to be performed. If the answer to the determination at step 1214 is No, then flow goes to step 1220. At step 1220, the SRH type MPLS extension header is removed from the packet, and the label stack entry (that includes a SID) at the top of the MPLS label stack is also removed. The packet is then forwarded and/or otherwise processed based on the remaining packet, e.g., the original inner packet. At steps 1214 and 1220, if the current segment is the last segment, the top label is popped (also referred to as removed) and the SRH type MPLS Extension Header is deleted (also referred to as removed). In other words, if there is no further segment in the segment list, then the top label stack entry is removed from the MPLS label stack (also referred to as the MPLS header), and the SRH type MPLS Extension Header is removed from the packet. The packet (which no longer includes an MPLS Extension Header) is then forwarded based on the header of the remaining packet, which includes the original inner packet, and potentially one or more other types of MPLS Extension Headers. In accordance with certain embodiments, a router can determine that there is no additional segment left in a segment list if Segment Count=Segment Pointer+1.

In accordance with certain embodiments, step 1214 is performed based on the contents of the SC field and the SP field, with the content of the SC field referred to as the Segment Counter, and the content of the SP field referred to as the Segment Pointer. More specifically, in accordance with certain embodiments, a router can determine if there is at least one additional segment left in a segment list if Segment Count>Segment Pointer+1.

If the answer to the determination at step 1214 is Yes, then flow goes to step 1216. At step 1216 one of the SIDs in the SRH type MPLS extension header is copied to the top of the MPLS label stack. Then at step 1218 the packet is forwarded to another router based on the SID in the label stack entry at the top of the MPLS label stack (which was placed there at step 1216). In accordance with certain embodiments, at step 1216 the Segment Pointer in the SRH is incremented by 1, and the SID pointed by the Segment Pointer (after it is incremented) is copied to the top label in the MPLS label stack (i.e., the MPLS header). The packet is then forwarded based on the top label stack entry, and more specifically, the SID specified in the Label Value field of the uppermost (i.e., top) label stack entry. In accordance with certain embodiments, as part of step 1214 or 1216, or some additional step, the TTL field in the top label is decremented by 1. It is also noted that it would be possible, in alternative embodiments, to utilize other techniques besides the use of pointers to know which SID to copy to the top of the MPLS label stack. Accordingly, the embodiments described herein should not be limited to use with pointers.

Service Function Chaining (SFC) can be supported using SR that is implemented using an MPLS Extension Header with advantages over SFC supported by conventional SR-MPLS. A noticeable issue of convention SR-MPLS based SFC is its lack of metadata carrying capability. Metadata may be critical for message passing and information sharing between service functions. This drawback limits the applicability of convention SR-MPLS for SFC. In accordance with certain embodiments of the present technology, metadata (that is useful for message passing and/or information sharing between service functions) can be carried in the optional TLV field 1014 in the SRH.

A Network Service Header (NSH) is type of header that can be inserted onto packets or frames to realize service function paths. Additionally, NSH provides a mechanism for metadata exchange along the instantiated service paths. NSH is a type of encapsulation used to support an SFC architecture. In accordance with certain embodiments, Segment Routing (SR) and NSH functionality can be integrated to better support SFC. More specifically, in accordance with certain embodiments of the present technology, the NSH can be encapsulated into the optional TLV field 1014 in the SRH. In such embodiments, the NSH provides a service plane and SR supports transport.

It is noted that the terms packet and datagram are often used interchangeably herein. Thus, it should be appreciated that after an original inner packet is modified, the resulting packet can be referred to interchangeably either as a modified packet or as a datagram. This is just one example of how these terms can be used interchangeably.

In accordance with certain embodiments of the present technology, a router includes a receiving module for receiving a packet over the MPLS network. The router also includes a modifying module for modifying the received packet by adding a SRH type MPLS extension header, wherein the SRH type MPLS extension header includes one or more SIDs that collectively provide a SID list for use in segment routing. Additionally, the router includes a copying module for copying one of the one or more SIDs in the SRH type MPLS extension header to a top of an MPLS label stack. The router further includes a forwarding module for forwarding the packet as modified via the network interface to another router of the MPLS network based on the one of the one or more SIDs included in a label stack entry at the top of the MPLS label stack. In accordance with certain embodiments, a router includes a receiving module for receiving a packet over the MPLS network, wherein the packet includes an MPLS label stack and a SRH type MPLS extension header, wherein the MPLS label stack includes a plurality of label stack entries with a label stack entry at a top of the MPLS label stack including a SID used to forward the packet to the router, and wherein the SRH type MPLS extension header includes one or more SIDs that collectively provide a SID list for use in segment routing. The router can also include a copying module for copying one of the one or more SIDs in the SRH type MPLS extension header to the top of the MPLS label stack. Further, the router includes a forwarding module for forwarding the packet to another router of the MPLS network based on the one of the one or more SIDs included in the label stack entry at the top of the MPLS label stack. In such embodiments, the receiving module can include, e.g., downstream ports (e.g., 310 in FIG. 3) and a transceiver (e.g., 316 in FIG. 3), or more generally, a network interface (e.g., 316 in FIG. 3). The modifying module can include, e.g., one or more processors (e.g., 320 in FIG. 3) and memory (e.g., 322 in FIG. 3) that stores instructions that are used to add certain fields and data to a packet, as well as remove certain field and data from a packet. The copy module can include, e.g., one or more processors (e.g., 320 in FIG. 3) and memory (e.g., 322 in FIG. 3) that stores instructions that are used to copy a SID from an SRH type MPLS extension header to the top of the MPLS header. The forwarding module can include, e.g., upstream ports (e.g., 314 in FIG. 3) and a transceiver (e.g., 312 in FIG. 3), or more generally, a network interface (e.g., 316 in FIG. 3). Any one of the above mentioned modules can be implemented using hardware, software, and/or combinations thereof.

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing segment routing over a multiprotocol label switching (MPLS) network, the method comprising:
    a router of the MPLS network receiving a packet;
    the router modifying the packet by adding a segment routing header (SRH) type MPLS extension header, the SRH type MPLS extension header including one or more segment identifiers (SIDs) that collectively provide a SID list for use in segment routing;
    the router copying one of the one or more SIDs in the SRH type MPLS extension header to a top of an MPLS label stack; and the router forwarding the packet as modified to another router of the MPLS network based on the one of the one or more SIDs included in a label stack entry at the top of the MPLS label stack.

2. The method of claim 1, wherein:
the SRH type MPLS extension header added to the packet by the router also includes a next header type (NHT) field, a header length (HLEN) field, a segment counter (SC) field, and a segment pointer (SP) field;
content of the NHT field specifies a type of a next header included in the packet as modified;
content of the HLEN field specifies a length of the SRH type MPLS extension header;
content of the SC field specifies a total number of SIDs in the SRH type MPLS extension header; and
content of the SP field specifies which SID within the SRH type extension header is included in the label stack entry at the top of the MPLS label stack.

3. The method of claim 1, wherein:
the SRH type MPLS extension header added to the packet by the router also includes a separate corresponding function and argument field for each SID of the one or more SIDs included in the SRH type MPLS extension header; and
for each SID, of the one or more SIDs included in the SRH type MPLS extension header, content of the corresponding function and argument field includes instructions and parameters for use in network programming associated with a segment specified by the SID.

4. The method of claim 1, wherein:
the router modifying the packet also comprises the router adding an indication within the MPLS label stack that one or more MPLS extension headers have been added to the packet.

5. The method of claim 1, wherein:
the MPLS label stack includes a plurality of MPLS label stack entries; and
the indication within the MPLS label stack that one or more MPLS extension headers have been added to the packet comprises an extension header label (EHL) within a label value field within one of the plurality of MPLS label stack entries included in the MPLS label stack.

6. A router for inclusion in a multiprotocol label switching (MPLS) network, the router comprising:
a network interface configured to receive and forward packets over the MPLS network;
a memory storage comprising instructions; and
one or more processors in communication with the memory storage and with the network interface, wherein the one or more processors execute the instructions to:
modify a packet received via the network interface by adding a segment routing header (SRH) type MPLS extension header, the SRH type MPLS extension header including one or more segment identifiers (SIDs) that collectively provide a SID list for use in segment routing;
copy one of the one or more SIDs in the SRH type MPLS extension header to a top of an MPLS label stack; and
forward the packet as modified via the network interface to another router of the MPLS network based on the one of the one or more SIDs included in a label stack entry at the top of the MPLS label stack.

7. The router of claim 6, wherein:
the SRH type MPLS extension header added to the packet by the router also includes a next header type (NHT) field, a header length (HLEN) field, a segment counter (SC) field, and a segment pointer (SP) field;
content of the NHT field specifies a type of a next header included in the packet as modified;
content of the HLEN field specifies a length of the SRH type MPLS extension header;
content of the SC field specifies a total number of SIDs in the SRH type MPLS extension header; and
content of the SP field specifies which SID within the SRH type extension header is included in the label stack entry at the top of the MPLS label stack.

8. The router of claim 6, wherein:
the SRH type MPLS extension header added to the packet by the router also includes a separate corresponding function and argument field for each SID of the one or more SIDs included in the SRH type MPLS extension header; and
for each SID, of the one or more SIDs included in the SRH type MPLS extension header, content of the corresponding function and argument field includes instructions and parameters for use in network programming associated with a segment specified by the SID.

9. The router of claim 6, wherein the one or more processors, when executing the instructions to modify the packet, add an indication within the MPLS label stack that one or more MPLS extension headers have been added to the packet.

10. The router of claim 6, wherein the router comprises a segment router source node.

11. A method for performing segment routing over a multiprotocol label switching (MPLS) network, the method comprising:
a router of the MPLS network receiving a packet including an MPLS label stack and a segment routing header (SRH) type MPLS extension header,
the MPLS label stack including a plurality of label stack entries with a label stack entry at a top of the MPLS label stack including a segment identifier (SID) used to forward the packet to the router, and
the SRH type MPLS extension header including one or more SIDs that collectively provide a SID list for use in segment routing;
the router, after receiving the packet, copying one of the one or more SIDs in the SRH type MPLS extension header to the top of the MPLS label stack; and
the router, after copying one of the one or more SIDs in the SRH type MPLS extension header to the top of the MPLS label stack, forwarding the packet to another router of the MPLS network based on the one of the one or more SIDs included in the label stack entry at the top of the MPLS label stack.

12. The method of claim 11, further comprising:
the router, after receiving the packet, but before performing the copying, determining whether there is at least one additional segment over which segment routing is to be performed for the packet; and
the router, in response to determining there is at least one additional segment over which segment routing is to be performed for the packet, performing the copying.

13. The method of claim 11, wherein:
the SRH type MPLS extension header includes a function and argument field for each SID of the one or more SIDs included in the SRH type MPLS extension header;

the router, after receiving the packet, but before performing the copying, comparing the SID in the label stack entry at the top of the MPLS label stack to a SID of the router to determine whether they match; and the router, in response to determining that the SID in the label stack entry at the top of the MPLS label stack matches the SID of the router, performing one or more functions specified by contents of the function and argument field included in the SRH type MPLS extension header for the SID in the label stack entry at the top of the MPLS label stack.

14. The method of claim 11, wherein:

the SRH type MPLS extension header included in the packet received by the router also includes a next header type (NHT) field, a header length (HLEN) field, a segment counter (SC) field, and a segment pointer (SP) field;

content of the NHT field specifies a type of a next header included in the packet;

content of the HLEN field specifies a length of the SRH type MPLS extension header;

content of the SC field specifies a total number of SIDs in the SRH type MPLS extension header; and content of the SP field specifies which SID within the SRH type extension header is included in the label stack entry at the top of the MPLS label stack.

15. The method of claim 14, wherein the content of the SP field comprises an SP value, and the method further comprising:

the router, after receiving the packet, but before performing the copying, incrementing the SP value; and the router, after incrementing the SP value, selecting based on the SP value which one of the one or more SIDs included in the SRH type MPLS extension header is copied to the top of the MPLS label stack.

16. The method of claim 11, further comprising:

the router receiving a further packet including a SID within a label stack entry at a top of an MPLS label stack of the further packet, and also including an SRH type MPLS extension header including one or more SIDs that collectively provide a SID list for use in segment routing of the further packet;

the router, after receiving the further packet, determining whether there is at least one additional segment over which segment routing is to be performed for the further packet; and the router, in response to determining there is no additional segment over which segment routing is to be performed for the further packet, removing the SRH type MPLS extension header from the further packet, and also removing the label stack entry including the SID at the top of the MPLS label stack of the further packet.

17. A router for inclusion in a multiprotocol label switching (MPLS) network, the router comprising:

a network interface configured to receive and forward packets over the MPLS network;

a memory storage comprising instructions; and one or more processors in communication with the memory storage and with the network interface, wherein the one or more processors execute the instructions to:

receive a packet including an MPLS label stack and a segment routing header (SRH) type MPLS extension header, the MPLS label stack including a plurality of label stack entries with a label stack entry at a top of the MPLS label stack including a segment identifier (SID) used to forward the packet to the router, and the SRH type MPLS extension header including one or more SIDs that collectively provide a SID list for use in segment routing;

copy one of the one or more SIDs in the SRH type MPLS extension header to the top of the MPLS label stack; and forward the packet to another router of the MPLS network based on the one of the one or more SIDs included in the label stack entry at the top of the MPLS label stack.

18. The router of claim 17, wherein:

the SRH type MPLS extension header includes a function and argument field for each SID of the one or more SIDs included in the SRH type MPLS extension header;

the one or more processors execute the instructions to:

compare the SID in the label stack entry at the top of the MPLS label stack to a SID of the router to determine whether they match; and in response to determining that the SID in the label stack entry at the top of the MPLS label stack matches the SID of the router, perform one or more functions specified by contents of the function and argument field included in the SRH type MPLS extension header for the SID in the label stack entry at the top of the MPLS label stack.

19. The router of claim 17, wherein:

the SRH type MPLS extension header included in the packet received by the router also includes a next header type (NHT) field, a header length (HLEN) field, a segment counter (SC) field, and a segment pointer (SP) field;

content of the NHT field specifies a type of a next header included in the packet;

content of the HLEN field specifies a length of the SRH type MPLS extension header;

content of the SC field specifies a total number of SIDs in the SRH type MPLS extension header; and content of the SP field specifies which SID within the SRH type extension header is included in the label stack entry at the top of the MPLS label stack.

20. The router of claim 17, wherein the content of the SP field comprises an SP value, and the one or more processors execute the instructions to:

increment the SP value, after the packet is received, but before the copying is performed; and select based on the incremented SP value which one of the one or more SIDs included in the SRH type MPLS extension header is copied to the top of the MPLS label stack.

21. The router of claim 17, wherein the one or more processors execute the instructions to:

receive a further packet including a SID within a label stack entry at a top of an MPLS label stack of the further packet, and also including an SRH type MPLS extension header including one or more SIDs that collectively provide a SID list for use in segment routing of the further packet;

determine whether there is at least one additional segment over which segment routing is to be performed for the further packet; and in response to determining there is no additional segment over which segment routing is to be performed for the further packet, remove the SRH type MPLS extension header from the further packet, and also remove the label stack entry including the SID at the top of the MPLS label stack of the further packet.

\* \* \* \* \*